(12) United States Patent
Hatcher et al.

(10) Patent No.: US 9,246,261 B2
(45) Date of Patent: Jan. 26, 2016

(54) HARSH ENVIRONMENT CONNECTOR WITH ROLLING SEALS

(71) Applicant: Teledyne Instruments, Inc., Thousand Oaks, CA (US)

(72) Inventors: Jonathan R. Hatcher, South Daytona, FL (US); William S. Taylor, Edgewater, FL (US); Justin M. Kretschmar, Port Orange, FL (US); Nicholas E. Hill, Edgewater, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 35 days.

(21) Appl. No.: 14/227,316

(22) Filed: Mar. 27, 2014

(65) Prior Publication Data

US 2015/0280355 A1 Oct. 1, 2015

(51) Int. Cl.
*G02B 6/38* (2006.01)
*H01R 13/523* (2006.01)
*G02B 6/50* (2006.01)

(52) U.S. Cl.
CPC .............. *H01R 13/523* (2013.01); *G02B 6/506* (2013.01)

(58) Field of Classification Search
CPC .. G02B 6/3825; G02B 6/3817; G02B 6/3897; G02B 6/3849; G02B 6/4292
USPC .......................... 385/53, 55, 75, 76, 77, 78, 84
See application file for complete search history.

(56) References Cited

U.S. PATENT DOCUMENTS

| | | | |
|---|---|---|---|
| 3,982,804 | A | 9/1976 | Marechal |
| 4,203,640 | A | 5/1980 | Bice et al. |
| 4,606,603 | A | 8/1986 | Cairns |
| 4,616,900 | A | 10/1986 | Cairns |
| 4,666,242 | A | 5/1987 | Cairns |
| 4,673,242 | A | 6/1987 | Logan et al. |

(Continued)

FOREIGN PATENT DOCUMENTS

| | | |
|---|---|---|
| DE | 615452 C | 7/1935 |
| EP | 0141746 A2 | 5/1985 |

(Continued)

OTHER PUBLICATIONS

International Search Report and Written Opinion for related international patent application No. PCT/US2015/018981, mailed on Jun. 3, 2015, in 10 pages.

*Primary Examiner* — Jennifer Doan
(74) *Attorney, Agent, or Firm* — Procopio, Cory, Hargreaves & Savitch, LLP

(57) ABSTRACT

An underwater rolling seal connector assembly has releasably mateable connector units with one or more rolling seals mounted in front faces of units. The rolling seals are rotatable back and forth between a closed position sealing one or more chambers within the respective units which contain one or more contacts and an open position in which bores through the seals are open to allow contacts in one unit to pass through the seal openings and engage contact in the other unit. A shell of one connector unit has inwardly facing cam formations and each rolling seal has outwardly directed eccentric rotators configured for engagement with respective cam formations on mating and de-mating of the connector units, whereby travel of the respective rotators along the respective cam formations during mating and de-mating rotates the rolling seals into the open and closed positions, respectively.

30 Claims, 15 Drawing Sheets

(56) References Cited

U.S. PATENT DOCUMENTS

| | | |
|---|---|---|
| 4,753,611 A | 6/1988 | Kobler |
| 4,773,725 A | 9/1988 | Ashman et al. |
| 4,795,359 A | 1/1989 | Alcock et al. |
| 4,865,563 A | 9/1989 | Ney et al. |
| 4,878,731 A | 11/1989 | Caron et al. |
| 4,929,184 A | 5/1990 | Emadi et al. |
| 4,948,377 A | 8/1990 | Cairns |
| 5,171,158 A | 12/1992 | Cairns |
| 5,194,012 A | 3/1993 | Cairns |
| 5,217,391 A | 6/1993 | Fisher, Jr. |
| 5,234,350 A | 8/1993 | Marechal et al. |
| 5,645,438 A | 7/1997 | Cairns |
| 5,685,727 A | 11/1997 | Cairns |
| 5,738,535 A | 4/1998 | Cairns |
| 6,017,227 A | 1/2000 | Cairns et al. |
| 6,315,461 B1 | 11/2001 | Cairns |
| 7,056,179 B2 * | 6/2006 | Courtney ................ 441/90 |
| 2005/0002617 A1 | 1/2005 | Nicholson |
| 2009/0080836 A1 | 3/2009 | Cairns et al. |
| 2014/0238772 A1 * | 8/2014 | Chelminski ................ 181/119 |

FOREIGN PATENT DOCUMENTS

| | | |
|---|---|---|
| EP | 0538089 A1 | 4/1993 |
| GB | 2166261 A | 4/1986 |
| SU | 1356080 A1 | 11/1987 |

* cited by examiner

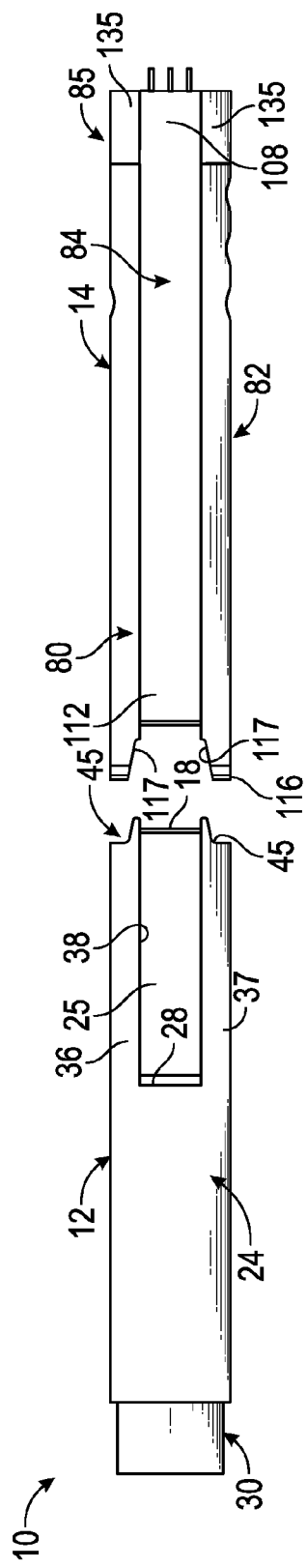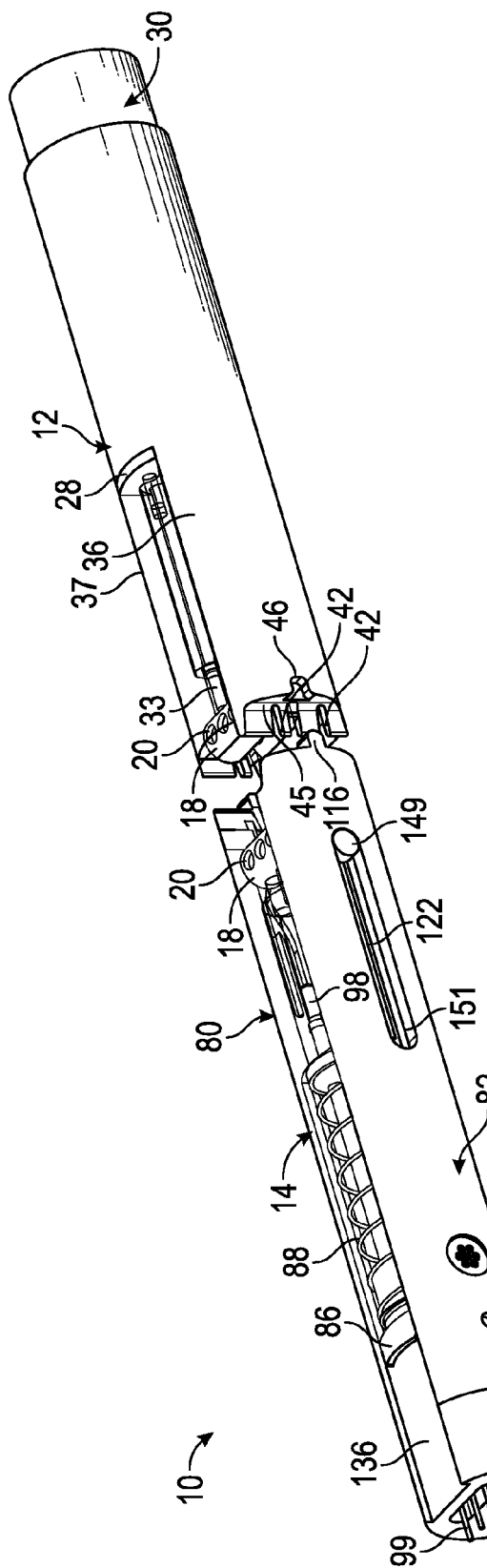
FIG. 1
FIG. 2

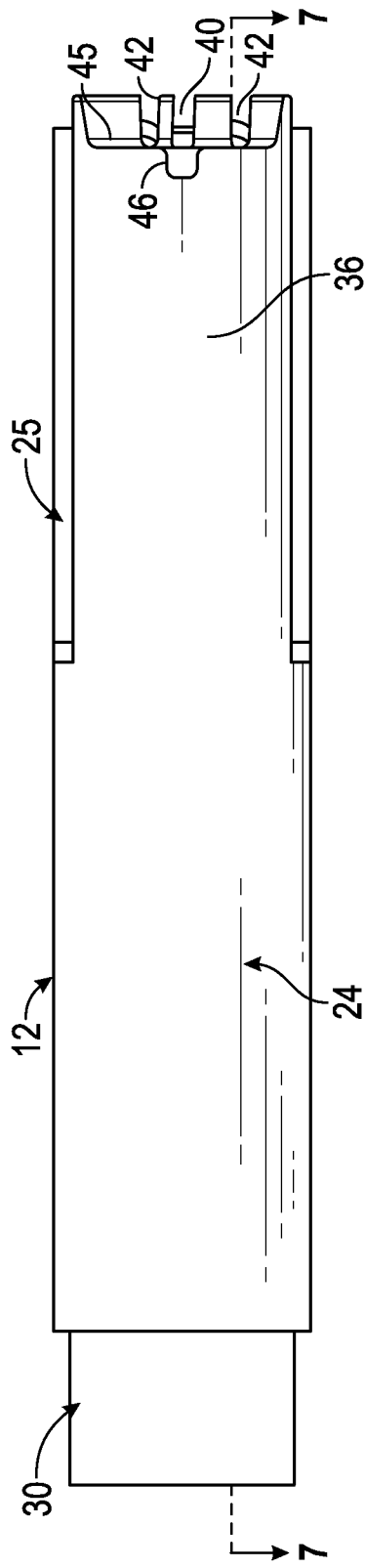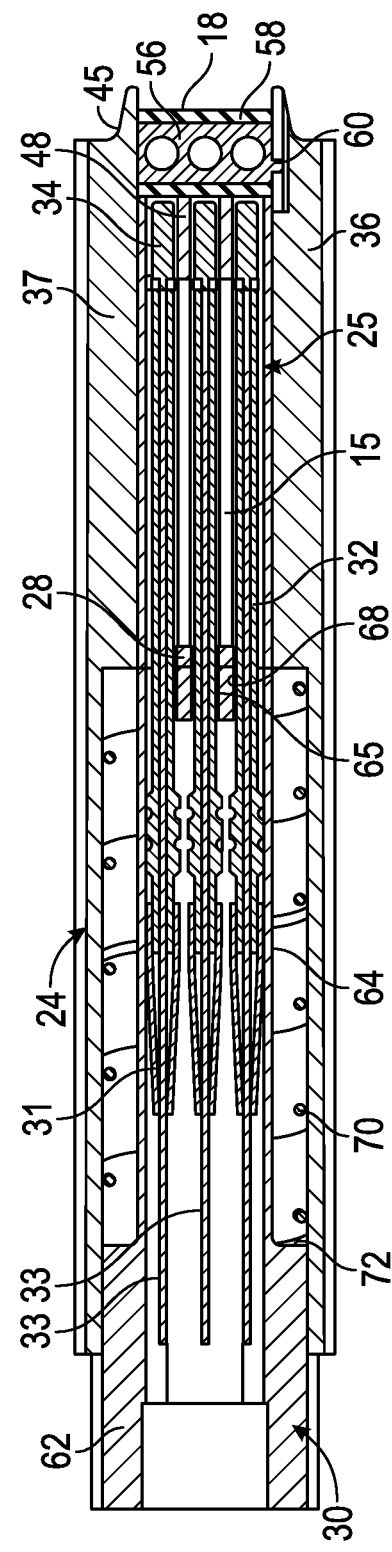

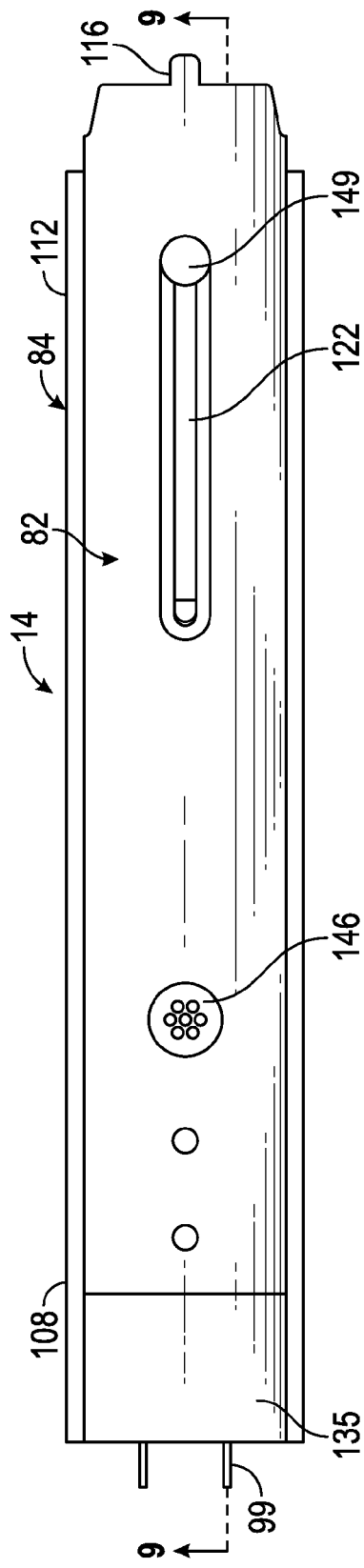
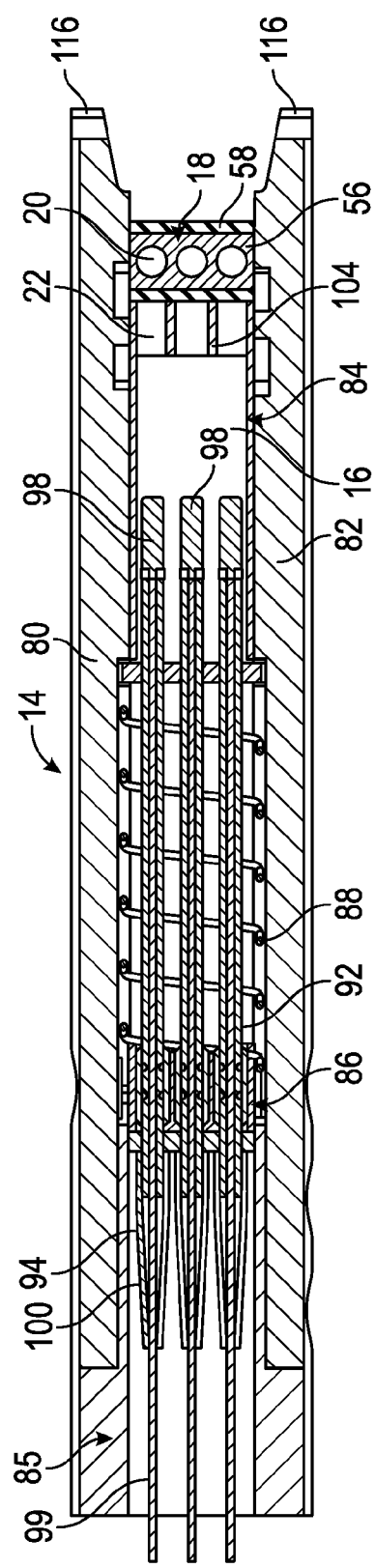

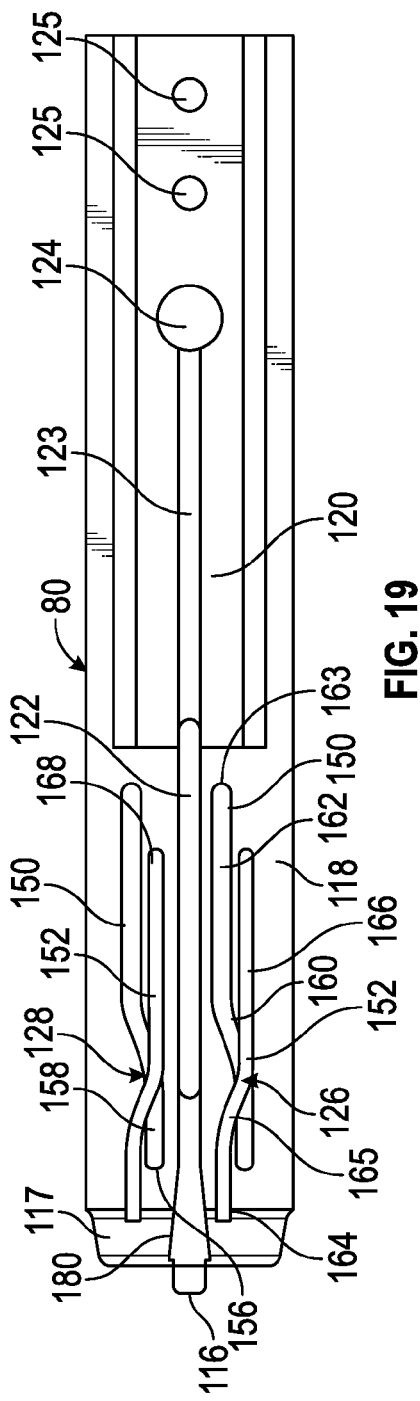

HARSH ENVIRONMENT CONNECTOR WITH ROLLING SEALS

BACKGROUND

1. Field of the Invention

The present invention relates generally to an electrical, optical, or electro-optical connector for use in harsh environments such as subsea environments, and is particularly concerned with the seal assembly in such connectors for closing and sealing contact chambers in mating plug and receptacle units of the connector when de-mated, and for allowing communication between the two units on mating to allow first contacts in one unit to extend through or past the seals into other unit for contact with second contacts in the other unit, while still sealing the contacts from the external environment.

2. Related Art

There are many types of connectors for making electrical and fiber-optic cable connections in hostile environments. One type includes connectors for undersea mating and de-mating. Such underwater connectors typically comprise a plug unit containing one or more contact probes and a receptacle unit containing an equivalent number of receptacle contacts or junctions for engagement with the contact probes, which extend into the receptacle unit when the units are connected together. Typically, the contacts or junctions are contained in a sealed chamber containing dielectric fluid, and the probes enter the chamber via one or more normally sealed openings. One major problem in designing such units is the provision of seals which adequately exclude sea water from the contact chamber even after repeated mating and de-mating, and also prevent dielectric fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. In the mated condition, the sphincter pinches against the entering probe to form a seal. Although this type of seal is successful in some cases, it does have disadvantages. One disadvantage is that this seal does not work well under all hostile conditions. Another disadvantage is that such seals tend to lose their "memory" after repeated mating and de-mating, so that they may fail to close completely, or may not close quickly enough to isolate the chamber from the surrounding environment when the units are de-mated. Another type of known seal mechanism comprises a piston which moves axially into the seal opening as the units are de-mated.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated. Other known fiber-optic connectors have similar seals which are not suitable for use under some conditions and may tend to lose effectiveness after repeated mating and de-mating.

Some prior seal mechanisms are not completely effective in providing repeatable, reliable optical and electrical connections in adverse environments while maintaining electrical or optical contacts or terminals in isolated chambers at all times. Optical connectors can be expensive and generally require complicated means for terminating the connector elements or junctions to the cables they are intended to connect.

So called rolling seal connectors, such as the connector described in U.S. Pat. Nos. 5,738,535 and 6,017,227 of Cairns et al., are harsh environment or underwater connectors in which dielectric fluid filled contact chambers in the plug and receptacle units are sealed at the forward ends of the connectors by rolling seals which roll or rotate around an axis transverse to the longitudinal axis of the connector units, and which have through bores aligned with respective bores or contact chamber inlets in the two units in the mated condition, and offset from the bores connected to the contact chambers so as to seal the chambers in the unmated condition. One or more actuator rods in one of the units are designed to extend into the other unit on mating and to engage with seal actuator tabs in both units during mating to roll the seals from the closed to the open position. The same actuators are designed to engage the seal actuator tabs in the opposite direction during de-mating, to roll the seals back into the closed, sealed condition. There is a risk that an actuator may become deformed if used improperly, in which case the seals may not return completely to the closed position.

SUMMARY

Embodiments described herein provide for a connector having plug and receptacle units with rolling seals which do not require separate actuators extending from one unit into the other to operate the seals.

According to one aspect, a connector assembly is provided which comprises first and second releasably mateable connector units, each connector unit having a longitudinal axis, a rear end, a shell, a manifold inside the outer shell having a forward end, a contact chamber containing at least one contact, at least one inlet at the forward end of the manifold which communicates with the contact chamber, at least one rolling seal rotatably mounted at the forward end of the manifold for rotation about a roll axis transverse to the longitudinal axis of the connector units, the seal member having at least one through bore and being rotatable between a first, closed position in which the through bore is offset from the contact chamber inlet when the units are unmated and the contact chamber is sealed, and a second, open position in which the seal through bore is aligned with the inlet for communication with the contact chamber when the units are mated, the manifold of the first connector unit being retractable in a rearward direction relative to the shell and the shell of the second connector unit being retractable in a rearward direction relative to the manifold during mating of the connector units, whereby a forward portion of the manifold of the second connector unit enters the shell of the first connector unit on mating, the shell of the first connector unit having inwardly facing cam formations and each rolling seal having an outwardly directed eccentric rotator configured for engagement with a respective cam formation on mating and de-mating of the connector units, whereby travel of the respective rotators along the respective cam formations during mating and de-mating rotates the rolling seals of both connector units into the open and closed positions, respectively.

The seal members may be disc-shaped or spherical, but in one embodiment each seal member is cylindrical. Each cylindrical seal member is rotatably mounted in the respective seat for rotation about its longitudinal axis, and one or more through bores extend through the seal member in a direction transverse to the longitudinal axis. Thus, the seal members roll from the closed to the open position as the units are connected together. The seal members are preferably of slightly larger dimensions than the cylindrical dimensions of the seat in which they are mounted, so that they are compressed slightly to form a better seal. There may be one, two or more rolling seals in each connector unit, with the respective connector unit having contacts aligned with the respective rolling seal openings or bores in the mated condition of the units.

In one embodiment, each connector unit has a plurality of contacts and one or more contact chambers in which the contacts are located. The forward end of each manifold has a plurality of inlets aligned with the respective contacts, and each of the bores terminates in a recessed, rolling seal seat in a front face of the body. The seal member has a series of transverse, parallel through bores extending across its diameter at spacings matching the spacing between the manifold inlets. The seal member is rotatably retained in the recessed seat so that a portion of the seal projects outwardly through the outwardly facing opening. One or more such seal members may be rotatably mounted in matching recessed seats in the front faces of the receptacle and plug units, depending on the number of contacts to be made in the connection.

Other features and advantages of various embodiments will become more readily apparent to those of ordinary skill in the art after reviewing the following detailed description and accompanying drawings.

BRIEF DESCRIPTION OF THE DRAWINGS

The details of various embodiments of a harsh environment connector, both as to its structure and operation, may be gleaned in part by study of the accompanying drawings, in which like reference numerals refer to like parts, and in which:

FIG. 1 is a side elevation view of aligned plug and receptacle units of one embodiment of a rolling seal connector in an unmated condition and aligned prior to movement of the units into mating engagement;

FIG. 2 is a perspective view of the separated plug and receptacle units of FIG. 1 prior to mating, with the plug and receptacle manifolds omitted to reveal the optical contact positions in the contact chambers;

FIG. 6 is a side elevation view of the plug unit rotated ninety degrees from the position of FIG. 1;

FIG. 7 is a cross-sectional view of the plug unit on the lines 7-7 of FIG. 6;

FIG. 8 is a side elevation view of the receptacle unit rotated ninety degrees from the position of FIG. 1;

FIG. 9 is a cross-sectional view of the receptacle unit on the lines 9-9 of FIG. 8;

FIG. 19 is a front elevation view of the inside of the first or "left" half of the receptacle shell of FIG. 5;

FIG. 20 is a front elevation view of the inside of the second or "right" half of the receptacle shell of FIG. 5;

DETAILED DESCRIPTION

Figure 3:
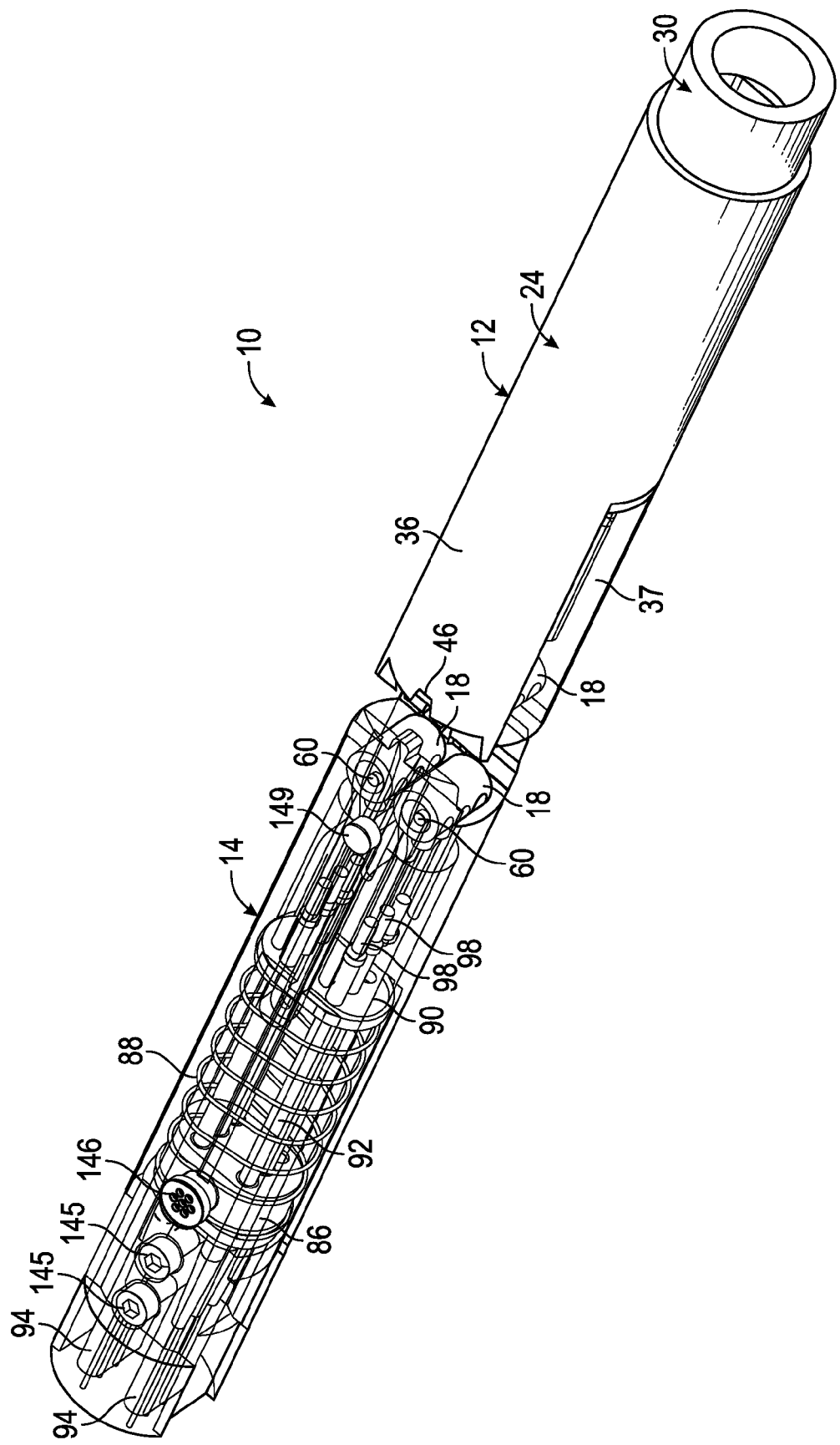
FIG. 3 is a perspective view similar to FIG. 2 with the manifolds omitted, but with the units rotated through ninety degrees and the shell of the receptacle unit transparent to reveal the internal components.

Certain embodiments as disclosed herein provide for a rolling seal connector comprising releasably mateable connector units with eccentric rotators on rolling seals of both connector units which engage cam formations in inner faces of one connector shell to rotate the rolling seals of both connector units back and forth between open and closed, sealed conditions on mating and de-mating.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

The drawings illustrate embodiments of a two part underwater connector for connecting optical, electrical, or electro-optical cables. The connector comprises first and second releasably mateable connector units. The connector units in one embodiment comprise a receptacle unit and a plug unit for releasable mating engagement with the receptacle unit. One of the connector units may comprise a fixed bulkhead unit or both connector units may be located at the ends of respective cables. In the embodiment of FIGS. 1 to 27, the connector is a six-way optical connector designed for making six fiber-optic connections. However, it will be understood that the connectors may be modified for making only electrical connections, only fiber-optic connections, or hybrid electro-optic connections. Additionally, a six-way connector embodiment is illustrated by way of example only, and it will be understood that the connector may alternatively be designed for making a greater or lesser number of fiber optic, electrical or hybrid connections, depending on the application. The connector may be used for making connections in any harsh environment, not only underwater or at great ocean depths, although it is particularly intended for use in underwater applications.

The connectors of the following embodiments are rolling seal connectors for use in a harsh environment or underwater connector in which contact chambers in the plug and receptacle units are sealed at the forward ends of the connectors by rolling seals which have through bores aligned with respective contact chamber inlets in the two units in the mated condition, and offset from the contact chamber inlets so as to seal the chambers in the unmated condition. The contact chambers contain contacts aligned with the respective chamber inlets and seal through bores in the mated condition, with the contacts in one unit extending through the respective aligned seal through bores to engage corresponding contacts in the chamber or chambers in the other unit. The contact chambers may comprise pressure balanced, dielectric fluid filled chambers. Each connector unit may have a single contact chamber containing all the contacts, as shown in the illustrated embodiment, or two or more separate contact chambers may be provided in each connector unit in other embodiments, with each contact chamber having contacts in alignment with inlets sealed by respective rolling seals having bores for alignment with the inlets in the sealed condition of the connector units.

FIGS. 1 to 27 of the drawings illustrate an embodiment of a two part, rolling seal connector 10 having first and second connector units for connecting optical cables. The connector units comprise a first connector or "plug" unit 12 and a mating second connector or "receptacle" unit 14 for releasable mating engagement with the plug unit. Although not illustrated in the drawings, in practice one or both of the plug and receptacle units are enclosed in respective outer connector housings which may have flying lead handles for engagement by an ROV (remotely operated vehicle) manipulating arm when mating or de-mating the connector units underwater. When the plug unit is secured in a fixed bulkhead or wall of an instrument housing, the receptacle unit may be secured at the end of an underwater cable in an outer connector housing with an ROV lead handle. Such outer connector housings are well known in the field and are therefore not described in detail herein.

Figure 24:
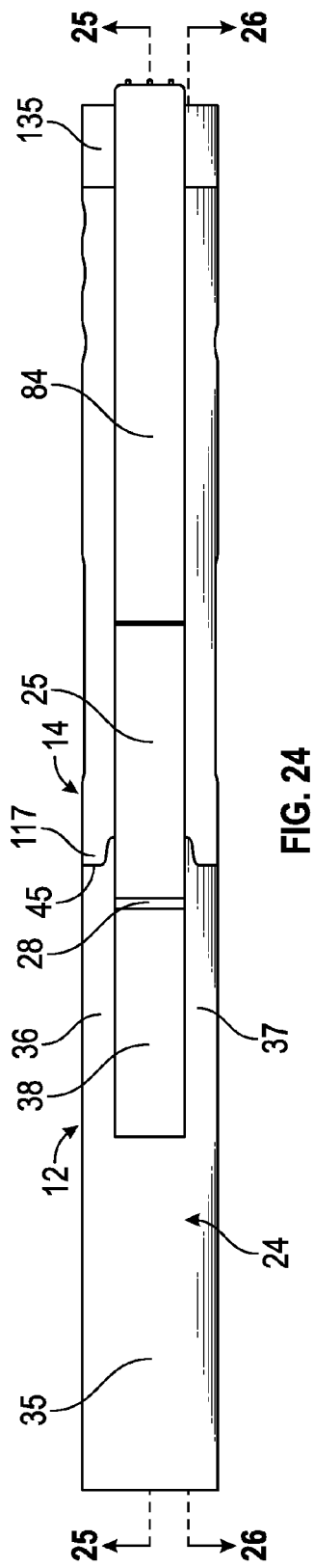
FIG. 24 is a side elevation view of the plug and receptacle units in the mated condition.
Figure 25:
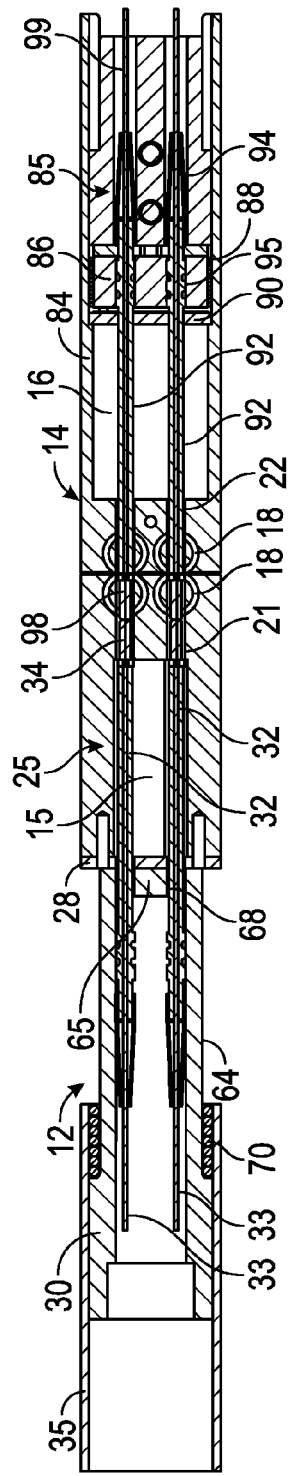
FIG. 25 is a cross-sectional view on the lines 25-25 of FIG. 24.
Figure 26:
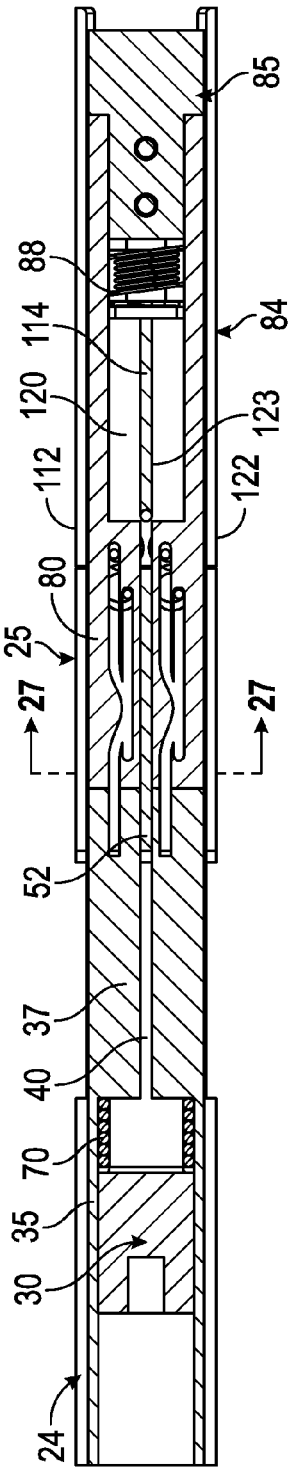
FIG. 26 is a cross-sectional view on the lines 26-26 of FIG. 24.

In one embodiment, harsh environment connector 10 comprises plug unit 12 and receptacle unit 14 as illustrated in the unmated or separated condition in FIGS. 1 to 9. The units interconnect in the mated condition to form an integral cylindrical connector 10 as illustrated in FIGS. 24 to 26. The connector in this embodiment has some elements in common with the rolling seal connector described in U.S. Pat. No. 6,017,227 of Cairns, the contents of which are incorporated herein by reference, but has a different seal actuator mechanism.

In the illustrated embodiment, oil-filled contact chambers 15, 16 in the plug and receptacle units are sealed at their front ends by rolling seals 18 in their end faces which have transverse through bores or openings 20 which are sealed shut and offset from respective contact chamber inlets 21, 22 in the two units in the unmated condition (see FIGS. 7 and 9), and which are unsealed and rotated into alignment with the chamber inlets in the mated condition (see FIG. 25). The rolling seals 18 in the plug and receptacle are identical in structure and the same reference numbers are used for these parts in both units. The contact chambers contain contacts aligned with the respective seal through bores in the mated condition, with the contacts in one unit extending through the respective aligned seal through bores to engage corresponding contacts in the chamber or chambers in the other unit, as described in more detail below. The contact chambers in each embodiment may be pressure balanced, dielectric fluid or oil filled chambers with the chamber walls defined by flexible bladders (not illustrated in the drawings) surrounding the contacts and providing pressure compensation between the pressure of fluid inside and outside the contact chamber by flexing inwardly or outwardly as appropriate, as is known in the field and as described in U.S. Pat. No. 6,017,227.

Figure 4:
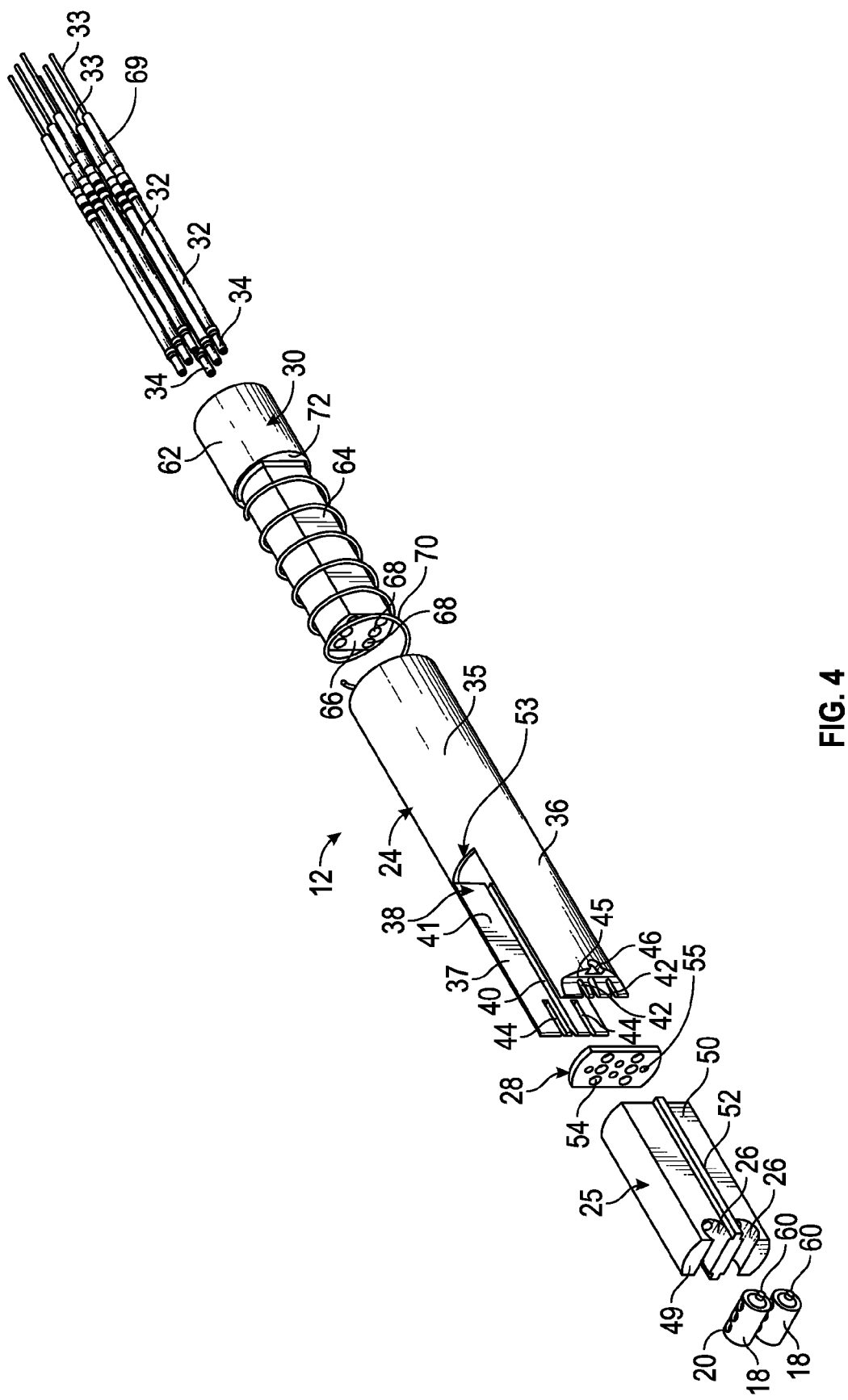
FIG. 4 is an exploded perspective view illustrating the separated components of the plug unit of FIGS. 1 to 3.
Figure 16:
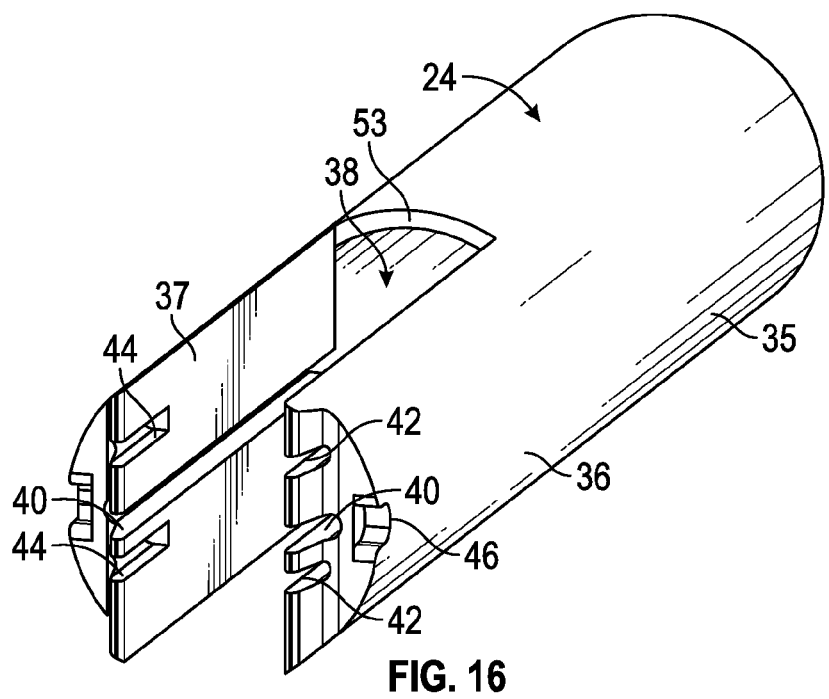
FIG. 16 is a front perspective view of the plug shell.

As best illustrated in FIGS. 4, 6 and 7, plug unit 12 comprises a plug shell 24, a plug manifold 25, a pair of rolling seals 18 designed for rolling engagement in part-cylindrical recesses or seal seats 26 in the front end face 49 of manifold 25, a manifold back plate 28, a plug sliding shell 30, and a plurality of optical stems 32 containing optical fibers 33 which terminate in contacts or ferrules 34 at the front end of the stems. Plug shell 24 is illustrated in more detail in FIG. 16, and has a hollow cylindrical rear portion 35 and a pair of spaced, forwardly projecting left and right side walls 36, 37 extending forward from rear portion 35 and defining a recessed seat region 38 between the walls for slidably receiving the plug manifold 25 and the back plate 28 which is secured over the open rear end of the plug manifold. An elongate, straight alignment formation or groove 40 extends along the inner face 41 of each side wall 36, 37 from the front end to the rear end of each wall. Additionally, a pair of spaced alignment formations or grooves 42, 44 extend inwardly a short distance from the front end of side walls 36, 37, respectively, on opposite sides of alignment groove 40. An outer indented formation 45 is located at the front end of each side wall 36, 37, and has an alignment recess or key 46 at its inner end, as best illustrated in FIG. 16. Alignment grooves or slots 42 in one side wall 36 are of smaller width than alignment grooves or slots 44 in the other side wall 37. As seen in FIGS. 4 and 16, one of the alignment grooves in each side wall is closer to groove 40 than the other alignment groove. Although the term "groove" is used in connection with the alignment formations 40, 42, and 44 in the opposing inner faces of the plug shell side walls, this term is not limited to an indent extending partially through the side walls, but also encompasses slots which extend completely through the respective side walls. The formations 40, 42 and 44 extend partially through the side walls along part of their length, and extend completely through the forward, indented portions 45 of the side walls.

Figure 10:
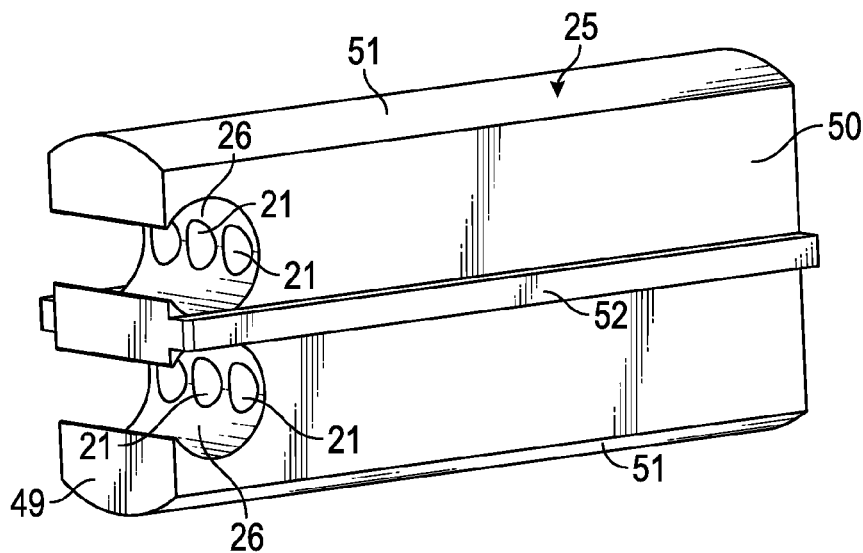
FIG. 10 is a front perspective view of the plug manifold.
Figure 11:
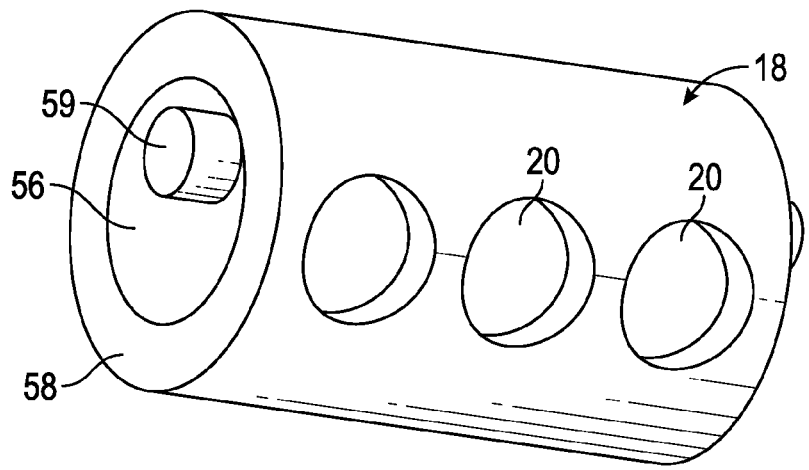
FIG. 11 is a perspective view of one of the rolling seals of the plug or receptacle units.

As illustrated in FIGS. 4, 7 and 10, plug manifold 25 comprises a hollow member of partially rectangular cross-sectional shape having a front end wall 48 in which plug seal seats 26 are located, and opposite flat or substantially flat side faces 50 designed for sliding engagement with inner, flat portions of faces 41 of the plug manifold side walls 36 and 37. End faces 51 of manifold which extend between side faces 50 are arcuate and of a curvature substantially matching that of the outer surface of plug shell 24. Contact chamber 15 is located inside manifold 25 between front end wall 48 and back plate 28, as illustrated in FIG. 7. An elongate alignment formation or rib 52 projecting outwards from each side face 50 engages in the respective alignment groove 40 to center and position the plug manifold 25 in recessed manifold seating area 38, with back plate 28 seated against the rear end 53 of area 38. As seen in FIG. 10, a row of three through bores or contact chamber inlets 21 extend from the inner end of each plug seal seat 26 through the front end wall 48 to communicate with contact chamber 15. Two lines of three openings 54 each extend across manifold back plate 28 and are aligned with respective inlets 21 at the inner end of each plug seal seat when the back plate is secured to the rear end of plug manifold 25 by suitable fasteners extending through fastener openings 55.

Figure 12:
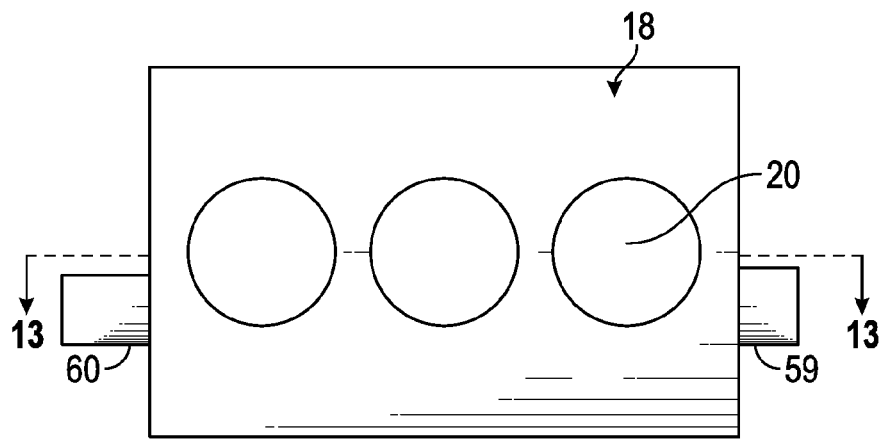
FIG. 12 is a side elevation view of the rolling seal of FIG. 11.
Figure 13:
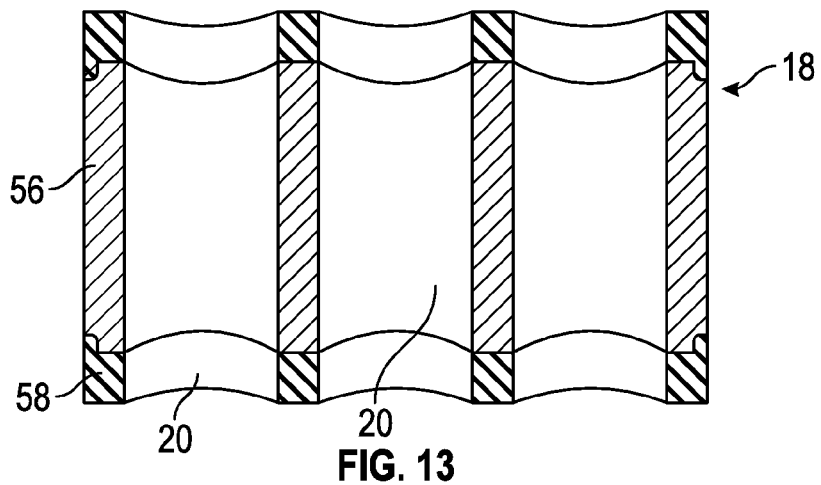
FIG. 13 is a cross-sectional view on the lines 13-13 of FIG. 12.
Figure 14:
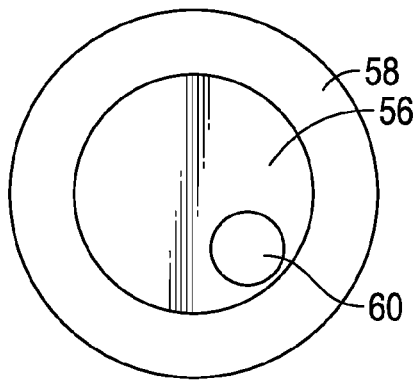
FIGS. 14 and 15 are opposite end views of the rolling seal illustrating the offset, eccentric cam lugs.
Figure 15:
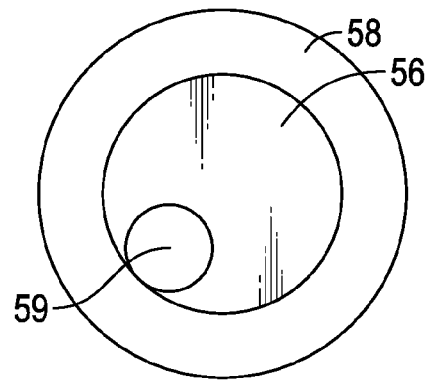

One of the rolling seals 18 is illustrated in more detail in FIGS. 11 to 15. The plug and receptacle rolling seals are identical in structure. As illustrated in FIG. 13, each seal 18 comprises an internal rigid axle 56 of metal or the like and an overmolded elastomeric outer layer 58 extending over the axle 56, with transverse bores 20 extending through the outer layer and axle. Respective eccentric rotators or cam lugs 59, 60 extend outwards from the opposite end faces of the metal axle 56. As best illustrated in FIGS. 12, 14 and 15, cam lug 60 is longer and of smaller diameter than cam lug 59. Rolling seals are rotatably mounted in indents 26 via the end openings in one of the side faces 50, with cam lugs 59, 60 projecting outwardly from each indent. In the unmated condition of the plug unit, plug manifold 25 is fully engaged in seat region 38 between side walls 36, 37, and the larger diameter cam lugs 59 at one end of each rolling seal as viewed in FIG. 4 engage the larger width alignment grooves or slots 44 in side wall 37 while the smaller diameter cam lugs 60 at the opposite ends of each rolling seal as viewed in FIG. 4 engage the smaller width alignment grooves or slots 42 in side wall 36. The number of rolling seals and the number of bores in each seal 18 depends on the number of connections to be made, which in this case is six, i.e. two sets of three, with each seal having three transverse bores 20, although a greater or lesser number of through bores and/or rolling seals may be provided, depending on the number of connections to be made.

The plug sliding shell 30 has a larger diameter, cylindrical rear portion 62 and a forward portion 64 of generally rectangular shape and smaller dimensions. Forward portion 64 extends forward from rear portion 62 and has a solid front end wall 65 with a front face 66 (see FIGS. 4, 7 and 25). A series of through bores 68 extend through front end wall 65 and are each aligned with a respective one of the manifold openings or chamber inlets 21. Wall 65 and back plate 28 form a rear end wall of the plug contact chamber, and respective optical stems 32 extend through respective through bores 68 and aligned openings 54 in back plate 28 into contact chamber 15, with the contacts or ferrules 34 at the forward ends of stems 32 located in the inlets 21 spaced a short distance from the open ends of the inlets in seal seats 26, as illustrated in FIG. 7. Optical fibers 33 pass through the bores of optical fiber stems and terminate to alignment ferrules which are secured in seats at the end of the respective tubular stems 32. Front end wall 65 forms an impermeable high pressure barrier at the terminal end of the plug unit. A rubber strain relief member or boot 69 is secured over the projecting end of each stem 32 and part of the optical fiber exiting the stem. Dielectric fluid from the contact chamber fills the forward end of each of the bores 68. Flexible bladders (not illustrated) provide pressure compensation between the pressure of fluid inside and outside the seal unit by flexing inwardly or outwardly as appropriate, for example as described in U.S. Pat. No. 6,017,227 referenced above. Plug return spring 70 acts between the shoulder 72 at the junction between forward portion 64 and rear portion 62 of the sliding shell 30 and the inner end of the bore in the rear portion of plug shell 24, as best illustrated in FIG. 7.

Figure 5:
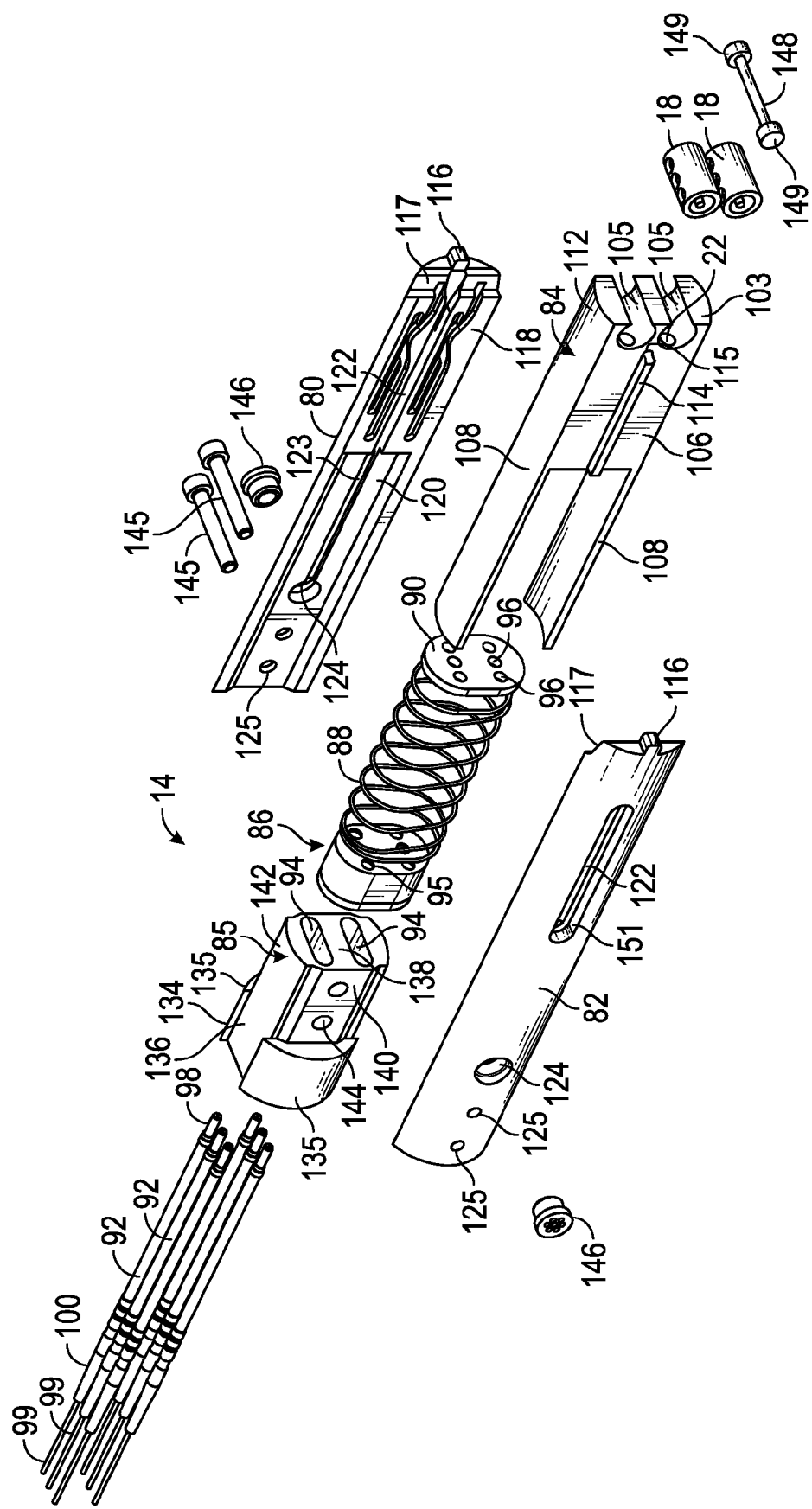
FIG. 5 is an exploded perspective view illustrating the separated components of the receptacle unit of FIGS. 1 to 3.

The components of mating receptacle unit 14 are shown separate from one another in the exploded view of FIG. 5, and basically comprise a multi-part shell comprising first and second rigid half shells 80, 82 connected together at their rear ends by connector chassis 85 and fasteners 145, a receptacle manifold 84 slidably engaged between the half shells, and a stem-retaining back plate 86. The half shells of the receptacle shell have opposing, partially flat inner faces 118. Return spring 88 acts between the front end of back plate 86 and manifold back plate 90. Optical stems 92 extend through a pair of parallel slots 94 in the connector chassis, two rows of three through bores 95 each in back plate 86, and through aligned holes 96 in manifold back plate 90 into contact chamber 16. Optical fibers 99 pass through the bores of optical stems 92 and terminate at contacts 98 in contact chamber 16 (see FIG. 9). A rubber strain relief member or boot 100 is secured over the projecting end of each stem 92 and part of the optical fiber exiting the stem. As with the plug unit, one or more flexible bladders (not illustrated) provide pressure compensation between the pressure of fluid inside and outside the seal unit by flexing inwardly or outwardly as appropriate, for example as described in U.S. Pat. No. 6,017,227 referenced above. As in the plug manifold, a pair of rolling seals 18 are rotatably retained in partially cylindrical seal seats or recesses 105 in the front wall 104 of receptacle manifold 84. The receptacle manifold also includes vent plugs or screens 146 and guide rod 148.

Figure 17:
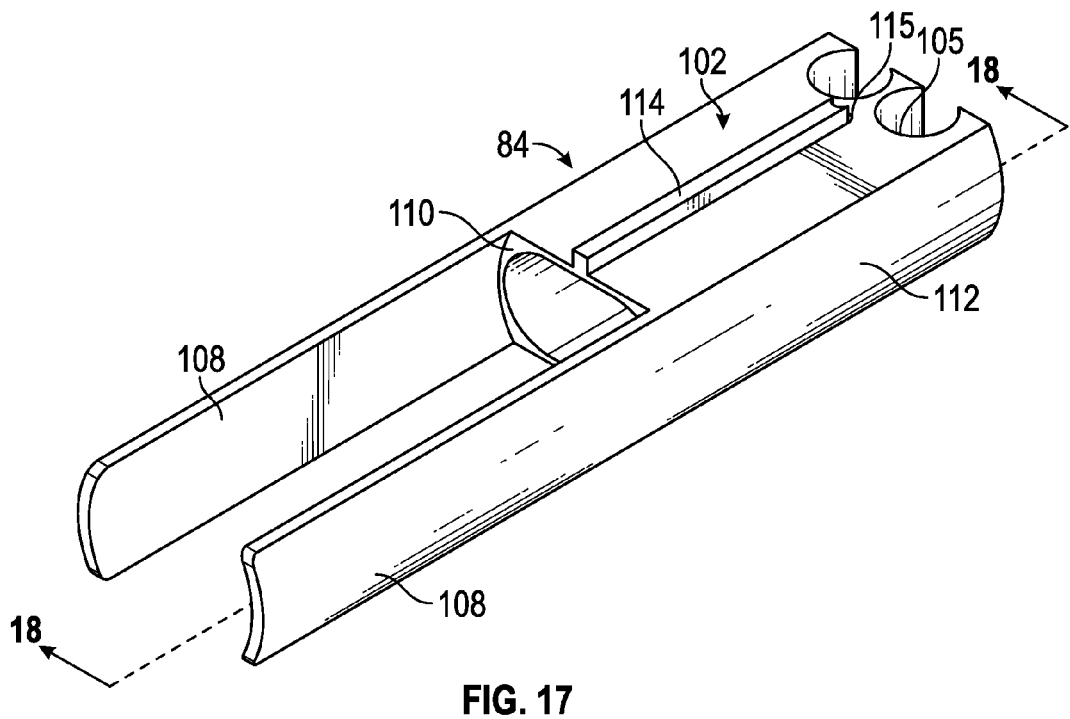
FIG. 17 is rear perspective view of the receptacle manifold.
Figure 18:
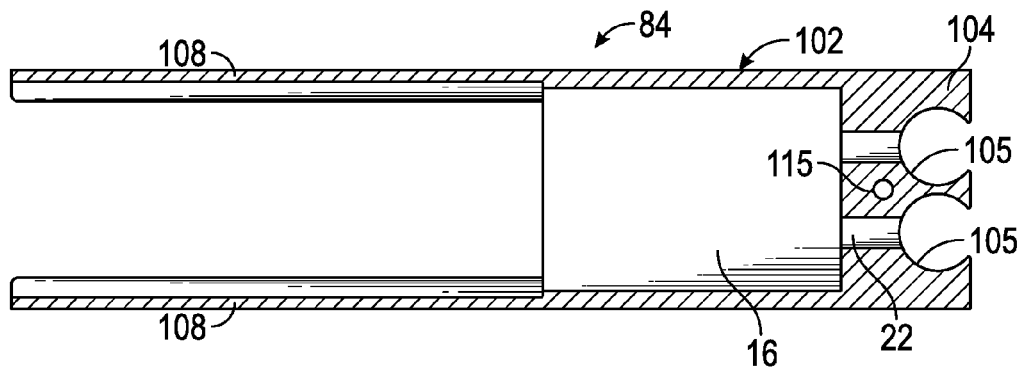
FIG. 18 is a cross-sectional view of the receptacle manifold on the lines 18-18 of FIG. 17.

As illustrated in FIGS. 5, 9, 17 and 18, receptacle manifold 84 has a front end portion 102 having a front end wall 104 in which receptacle seal seats 105 are located, and opposite, substantially flat side faces 106 designed for sliding engagement with inner faces 118 of the half shells 80 and 82. Front end portion 102 is of partially rectangular shape substantially matching that of plug manifold 25. Opposing arcuate rear extensions or walls 108 extend rearward from the open end face 110 of the end portion 102, and form continuations of the opposite arcuate end walls 112 of front end portion 102. These extensions act as guides during mating and de-mating of the units, as described in more detail below. Contact chamber 16 is located inside the front end portion 102 of the manifold, between front end wall 104 and back plate 90 which is secured across the open end face 110 on assembly, as illustrated in FIG. 9. An elongated alignment formation or guide rib 114 projects outwards from each side face 106, and a guide bore 115 extends through the manifold between faces 106 at the forward ends of the ribs, as best illustrated in FIGS. 17 and 18. As seen in FIGS. 5, 9, and 18, a row of three through bores or contact chamber inlets 22 extend from the inner end of each receptacle seal seat 105 through the front end wall 104 to communicate with contact chamber 16. The two rows of openings 96 extending across manifold back plate 90 are aligned with respective inlets 22 at the inner end of each receptacle seal seat when the back plate is secured to the end face 110 of the contact chamber by suitable fasteners extending through fastener openings (not illustrated).

The opposing, first and second half shells 80, 82 each have arcuate outer faces, and have generally flat inner faces with various cam and guide or alignment formations, as described in more detail below. Starting at the forward end of each half shell, a central tongue 116 is designed for engagement in respective alignment recess 46 at the forward end of the opposing plug side wall 36, 37, and an inwardly facing recess 117 is shaped for mating engagement with outer key indent 45 of the respective plug side wall, as illustrated in FIG. 1 with the units positioned in alignment prior to mating, and in FIG. 24 illustrating the fully mated units. Inner faces 118 each have an indented or recessed portion 120 spaced rearward from the front end of the shell and extending up to the rear end of each shell half. A generally central alignment formation comprising a straight guide slot or groove 122 extends along each face 118, with an aligned groove 123 in recessed portion 120 forming an extension of slot or groove 122, terminating at enlarged opening 124. Again, the term "groove" is not limited to a partial indent in the opposing faces of the half shells, but also encompasses slots extending completely through the walls of each shell half, and grooves 122 extend completely through shell walls 80 and 82 along indented external recesses 151, as seen in FIG. 5. A pair of spaced fastener openings 125 are provided between enlarged opening 124 and the rear end of each shell. First and second sets of inwardly facing cam formations 126, 128 are provided on opposite sides of the guide groove 122 of first half shell 80, as illustrated in FIG. 19, and similar first and second sets of inwardly facing cam formations 130, 132 (see FIG. 20) are provided on opposite sides of the guide groove 122 of second half shell 82, as described in more detail below with reference to FIGS. 19 and 20.

Connector chassis 85 which forms the rear end of the receptacle shell has an enlarged rear end portion 134 with opposite arcuate outer side faces 135 and opposing indented faces 136 between the side faces 135, and a forward portion of reduced dimensions extends from rear end portion 134. The forward portion has indented side faces 140 extending from arcuate side faces 135 of the end portion 134, and arcuate surfaces 142 between the side faces 135 which form a continuation of indented faces 136. The forward portion is also of partially rectangular cross section. Arcuate outer side faces 135 are designed to match the outer arcuate faces of the respective half shells 80 and 82, while opposing indented faces 136 are designed for receiving the ends of receptacle manifold extensions 108 when the parts are assembled as in FIG. 1. Transverse through bores 144 extending between side faces 140 are positioned for alignment with fastener openings 125 of the two half shells 80, 82 on assembly of the components of the receptacle unit, as described below. The shape of side faces 140 is designed to closely match the indented shape of the inner faces of half shells 80, 82 extending from the end of face 118 to the rear end of each half shell, in a tongue and groove type of configuration when viewed in cross-section. Stem-retaining back plate 86 is a generally solid member of generally oval or part rectangular cross-sectional shape substantially matching the shape and dimensions of front end face 138 of connector chassis 85 and the manifold back plate 90, with through bores 95 extending between opposite ends of back plate 86.

Assembly of the parts of receptacle unit 14 will now be described in more detail. Rolling seals 18 which are identical to the rolling seals of plug unit 12 are rotatably mounted in each of the seats 105 to seal the open forward ends of contact chamber inlets 22 in the closed, unmated position illustrated in FIG. 9. The number of through bores in each seal 18 corresponds to the number of connections to be made, as discussed above, and in this case three parallel bores 20 are provided in each seal. Before assembly of the manifold 84 with the remainder of the receptacle unit, the shell is assembled by securing the rear ends of half shells 80, 82 on opposite sides of the indented forward portion of connector chassis 85, via shell screws 145 extending through aligned fastener openings 125 and bores 144. Vent screens or plugs 146 are secured in openings 124 of half shells 80 and 82, and the openings in the vent screens provide communication between the external environment and the interior of the shell outside the contact chamber or chambers or the flexible bladder (not illustrated) surrounding the contact chamber, for pressure compensation purposes during mating and de-mating.

The receptacle manifold is slidably engaged between half shells 80 and 82 with oppositely directed ribs 114 engaging in the respective guide grooves 122 and the guide extensions 108 extending over stem-retaining back plate 86 and sliding over faces 142 of the connector chassis into the indented regions 136 of the enlarged rear end portion of the connector chassis, as seen in FIGS. 1 and 25. The receptacle manifold and plug manifold are omitted in FIG. 2 and both the connector half shell and receptacle manifold are made transparent or cut away in FIG. 3 to reveal the internal components of the connector units more clearly. Guide rod 148 extends transversely through the slots 122 in the shell halves and the through bore 115 in the receptacle manifold, as best illustrated in FIG. 3, and has an enlarged head 149 at each end which slide in respective indented recesses 151 outside the slots 122. This helps to keep the receptacle manifold properly aligned with the other components as it is urged inwards relative to the half shells during mating and de-mating, as described in more detail below.

The cam formations 126, 128 and 130, 132 in the inner faces of the respective shell halves each comprise two overlapping cam grooves of predetermined shapes, as best illustrated in FIGS. 19 to 23D. One of the cam grooves of each formation is engaged with a respective eccentric rotator or cam lug 59 or 60 of the respective receptacle rolling seal at all times, while the other, overlapping cam groove of each cam formation is designed to receive a respective eccentric rotator or cam lug 59 or 60 of the respective plug rolling seal during mating and de-mating, as described in more detail below in connection with FIGS. 19 to 23D. The rolling seals 18 in the plug and receptacle units are installed such that, when the front end faces of these units are aligned ready for mating engagement as in FIGS. 1 to 3, the cam lugs 59 of the plug unit are at the same side of the connector as the cam lugs 60 of the receptacle unit, and vice versa.

Figure 27:
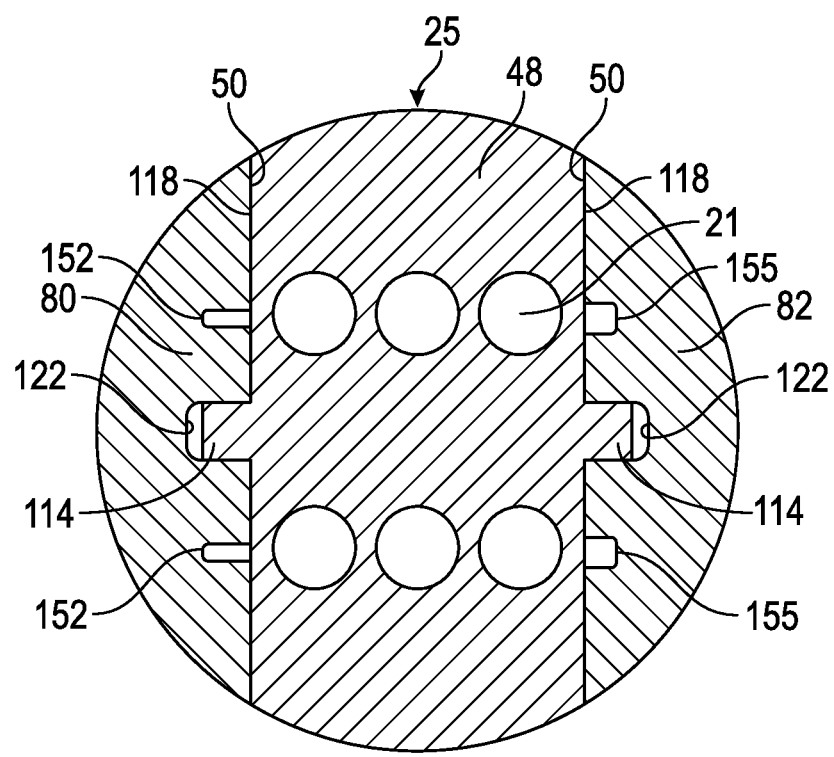
FIG. 27 is a cross-sectional view on the lines 27-27 of FIG. 26, with the connector stems omitted, illustrating the mating sliding engagement between opposing inner and outer faces of the receptacle shell and receptacle manifold as well as the cam grooves for receiving the plug seal cam lugs.

The cam grooves for engaging eccentric rotators or lugs 59 and 60 are cut at two different widths and depths. This allows the paths of the two grooves to cross and function during both the seal opening and closing sequences. Thus, as illustrated in FIG. 19, each cam formation 126, 128 of the first half shell 80 has a first cam groove 150 of larger width and reduced depth designed for receiving the larger diameter cam lug 59 at one end of respective receptacle rolling seal, and a second cam groove 152 of smaller width and deeper depth designed for receiving the longer, smaller diameter cam lug 60 at the equivalent end of a respective plug rolling seal when the connector units are aligned facing one another ready for mating. As illustrated in FIG. 20, the cam formations 130, 132 of the second half shell 82 are reversed, with the top grooves 154 being narrower and deeper for receiving the cam lugs 60 of the receptacle seals and the bottom grooves 155 being wider and shallower for receiving the cam lugs 59 of the plug seals. The different groove dimensions are also illustrated in the cross-sectional view of the receptacle shell and manifold in FIG. 27. As seen in FIG. 27, the cam grooves 152 in half shell 80 designed to receive the smaller diameter cam lugs 60 of the plug seals on mating engagement of the units are narrower and slightly deeper than the cam grooves 155 in the half shell 82 designed to receive the larger diameter cam lugs 59 of the plug seals. Since the plug seal and receptacle seal cam lug receiving grooves of each cam formation overlap, this difference in dimensions prevents the plug seal cam lugs from entering a receptacle seal cam lug receiving groove during mating and de-mating, and vice versa.

As illustrated in FIG. 19, the cam grooves 150 receiving the cam lugs 59 of the receptacle seals are closed at each end and the receptacle seal cam lugs are retained in these grooves at all times. Similarly, the smaller width cam grooves 154 of shell half 82 which receive the cam lugs 60 at the opposite ends of the receptacle seals are also closed at each end, as illustrated in FIG. 20. The cam lugs 59 and 60 are located at the forward ends 156, 157 of the respective cam grooves in the unmated condition of the plug and receptacle units. In this position, the receptacle seals 18 are positioned as seen in FIGS. 2, 3 and 9, with the through bores or openings 20 extending transverse to the chamber inlets 22 so that the contact chamber 16 is sealed. The position 60A of receptacle cam lugs 60 at the forward ends 157 of cam grooves 154 of half shell 82 in the unmated, sealed condition of the receptacle unit is shown in solid outline in FIG. 21, and it will be understood that eccentric cam lugs 59 at the opposite ends of the receptacle seals will also be located at the forward ends 156 of cam grooves 150 of half shell 80 in the unmated, sealed condition.

Cam grooves 150 of first half shell 80 are of matching shape, and each has a straight portion 158 extending from front end 156, an inclined portion 160, and a second straight portion 162 extending from inclined portion 160 to the rear end 163 of the respective groove. Cam grooves 152 are also of matching shape, and are open at their forward ends with a straight portion 164 extending from the forward end, an inclined portion 165 which overlaps inclined portion 160 of the respective groove 150, and a straight portion 166 extending from inclined portion 165 to the rear end 168 of the respective groove. Similarly, cam grooves 154 of the second half shell 82 each have a straight portion 170 extending from forward end 157, an inclined portion 172, and a straight portion 173 extending from inclined portion to the rear end 174 of the respective groove. Cam grooves 155 are each open at their forward end, and have a straight portion 175 extending from the forward end, an inclined portion 176 overlapped by respective groove 154, and a straight portion 177 extending from inclined portion 176 to the rear end 178 of the respective groove. The inclined portions control rotation of the respective seals between closed and sealed conditions and open conditions, and are designed such that the plug and receptacle seals rotate in unison.

When the plug and receptacle units are mated as in FIGS. 24 to 26, the plug and receptacle rolling seals are rotated into the open position with bores 20 aligned with the contact chamber inlets 21 and 22, while the receptacle manifold block is urged inwardly into shell 80,82 so that the receptacle contacts 98 project out of contact chamber 16 through the contact chamber inlet 22 and aligned bores or openings 20 in the receptacle and plug seals for engagement with the corresponding plug contacts 34 either in the contact chamber inlets 21 as seen in FIG. 26 or in the plug contact chamber 15 in alternative embodiments. At the same time, plug shell 24 is urged rearward by receptacle half shells 80, 82, compressing return spring 70, while the forward end of plug manifold enters the open end of the receptacle shell formed by half shells 80, 82, as best illustrated in FIGS. 25 and 26. During mating, the alignment ribs 52 of the plug manifold travels along alignment grooves 40 in the plug shell while the shell is pushed back by engagement with the forward end of the receptacle shell, and the alignment ribs 114 of the receptacle manifold travel along straight alignment grooves/slots 122 of the two half shells 80, 82 forming the receptacle shell while the receptacle manifold is urged inward by engagement with the front end of the plug manifold 25. Additional alignment is provided by the ends of receptacle manifold guide rod 148 extending through slots 122 while enlarged ends 150 travel along the outer recessed ledges 151 surrounding the slots in the outer surfaces of the half shells. The generally rectangular cross-sections of the relatively sliding plug and receptacle manifolds 25, 84 and the matching, generally flat inner wall portions of plug and receptacle shells 24 and 80, 82 which slidably engage the outer flat faces of the respective manifolds, as illustrated in FIG. 27 for the plug manifold entering the receptacle shell, also assist in maintaining proper alignment between the relatively sliding parts as the cam lugs engage the respective cam grooves to rotate the seals.

Figure 21:
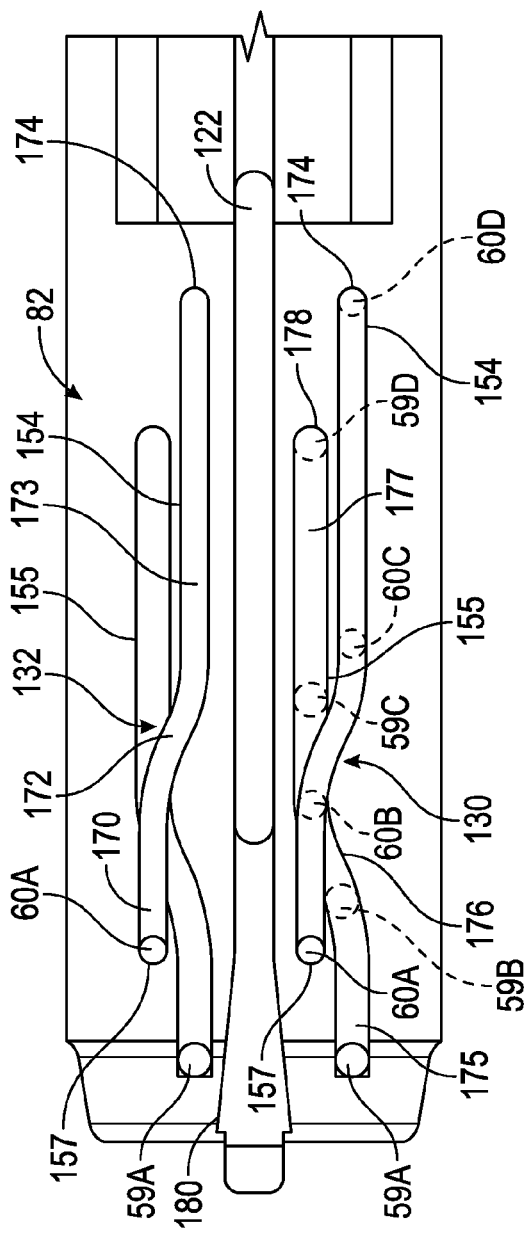
FIG. 21 is an enlarged front elevation view of the second half of the receptacle shell, illustrating the positions of the cam lugs at one end of the receptacle seals and at one end of the plug seals in the cam formations or grooves at various points during mating engagement of the plug and receptacle units.
Figure 22:
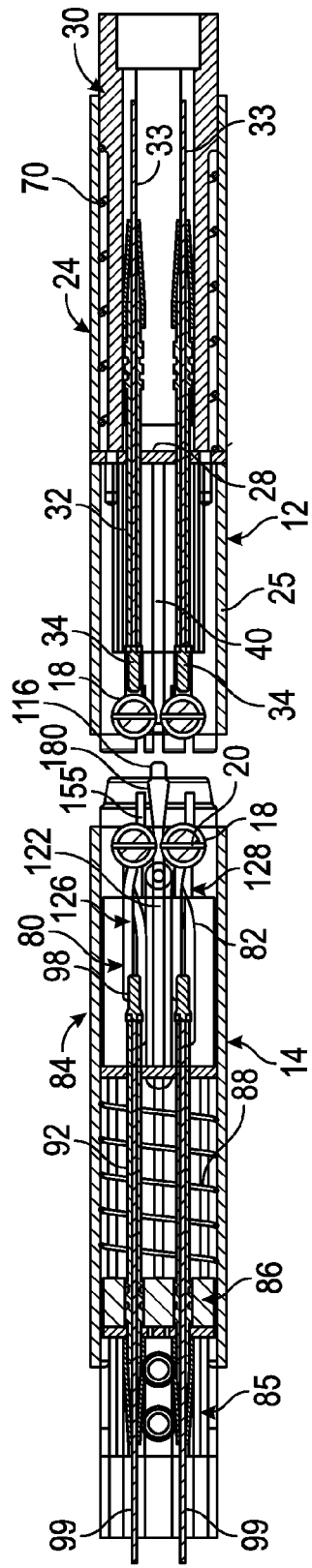
FIG. 22 is a longitudinal cross-sectional view of the plug and receptacle units with the rolling seals in the closed and sealed condition prior to mating, with parts of the plug and receptacle manifolds omitted to reveal the rolling seals as well as the cam groove formations on one inner face of the plug and receptacle shells.

Operation of the mating cam formations of the plug and receptacle seals and the cam grooves in the receptacle shell during mating and de-mating of the units will now be described in more detail with reference to FIGS. 21 to 23D. FIGS. 1-3 and 22 illustrate the plug and receptacle units aligned and facing one another immediately before movement into mating engagement. In the closed and sealed condition of the plug and receptacle units, the plug and receptacle rolling seals 18 are all in a sealed orientation, with the through bores or openings 20 extending transverse to the longitudinal axes of the respective contact chamber inlets 21, 22. The part-cylindrical, open ended seal receiving recesses 26, 105 in the front faces of the plug and receptacle manifolds 25 and 84, respectively, are of slightly smaller diameter than the respective elastomeric sleeves or outer layers 58 of the plug and receptacle seals 18. Each rolling seal slides into the recess 26 or 105 via one open end so that the elastomeric sleeve is compressed into sealing engagement with the recess and open outer end of the respective contact chamber inlet. At the same time, the outer surface of the elastomeric sleeve or layer 58 projects slightly outward from the flat front face 49, 103 of the respective manifold 25, 84. When the front ends of the units are initially brought into engagement (either by moving both units towards one another or moving one unit into engagement with the other, stationary unit), the mating formations at the front ends of the plug and receptacle shells are first engaged, with alignment tongues or projections 116 at the front end of the receptacle shell entering the alignment recesses or indents 46 at the front end of the plug shell. The front end faces 49, 103 of the plug and receptacle manifolds are urged into face to face engagement, compressing the projecting portions of the plug and receptacle seals into sealing engagement. At this point, the receptacle seal cam lugs 60 at one end of each receptacle seal are at the forward ends 157 of cam grooves 154 in half shell 82, as illustrated at 60A in FIG. 21, and the cam lugs 59 at the opposite end of each receptacle seal are located at the forward ends 156 of the corresponding cam grooves 152 in first half shell 80, as illustrated at 59A in FIG. 23A. The plug seal cam lugs 59 and 60 at this point are still located in cam lug receiving grooves or slots 44 and 42, respectively, of the spaced plug shell side walls 36 and 37. As the rolling seals make contact in the position illustrated in FIG. 23A (other parts of the plug unit apart from the rolling seals are eliminated in this view for clarity of the cam lug positions), the plug seal cam lugs 60 and 59 start to move into the aligned open ends of cam lug receiving grooves 152 and 155, respectively, of half shells 80 and 82. This position is shown at 60A for the plug seal cam lugs 60 and cam grooves 152 of half shell 80 in FIG. 23A, while the larger cam lugs 59 of the receptacle seals are shown at the start position 59A at the forward ends 156 of larger width cam lug receiving grooves 150. FIG. 21 shows the same start position 59A and 60A for plug seal cam lugs 59 and receptacle seal cam lugs 60 in respective cam grooves 154 and 155 of the opposite half shell 82.

Figure 23A:
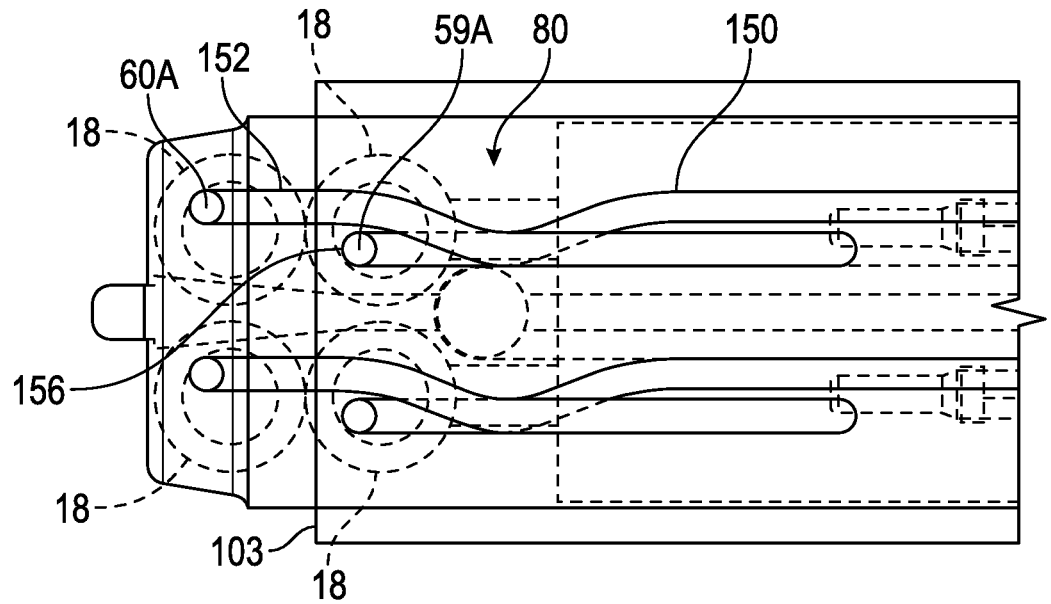
FIGS. 23A to 23D are enlarged side elevation views of the forward end portion of the inner face of the first half of the receptacle shell as in FIG. 19 at successive stages during mating engagement of the plug and receptacle unit with the plug manifold entering the receptacle manifold and the plug seal and receptacle seal cam lugs traveling along the respective plug and receptacle cam grooves to rotate the seals into the open position.
Figure 23B:
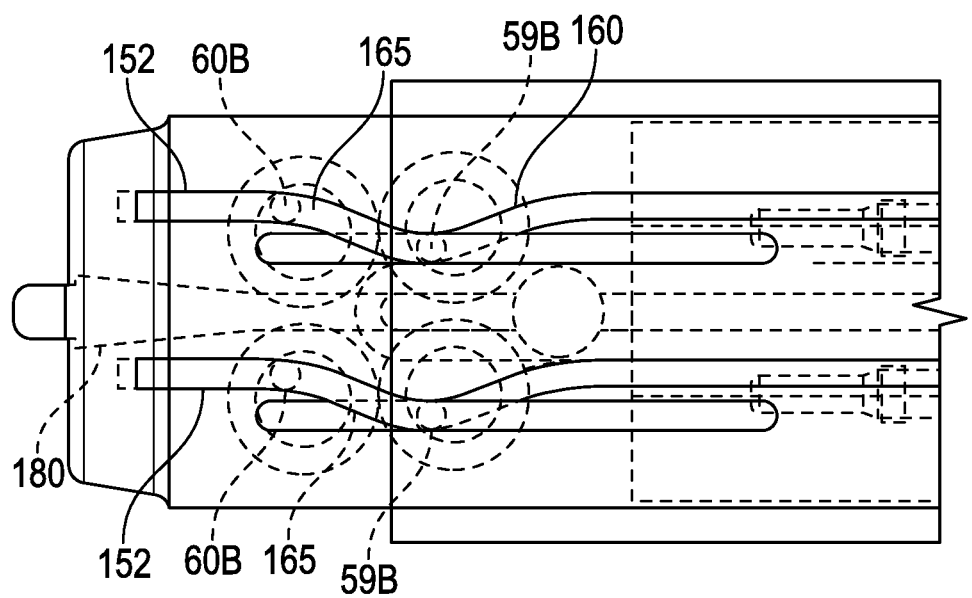
Figure 23C:
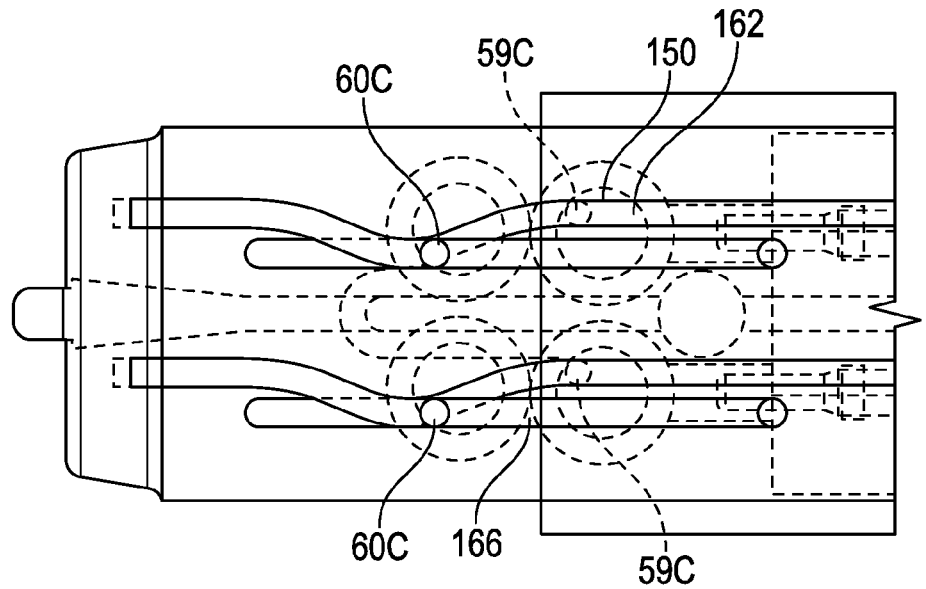

As the plug manifold and plug manifold seals force the receptacle manifold and receptacle manifold seals back into the receptacle shell, the plug manifold alignment ribs 52 start to enter the enlarged or funnel-shaped open ends 180 of alignment grooves 122 in faces 118, and the plug and receptacle cam lugs travel along the respective cam grooves. At position 59B of the plug cam lug in groove 155 and position 60B of the receptacle cam lug 60 in groove 154 in FIG. 21 and the corresponding positions 60B and 59B of the oppositely directed plug cam lugs and receptacle lugs in opposing cam grooves 152 and 150 in FIG. 23B, the plug and receptacle seals begin to open. This is due to the engagement of the plug cam lugs 59 and 60 at the start of the respective inclined cam groove portions 176 and 165 of the opposing receptacle half shells 82 and 80, and simultaneous engagement of the receptacle cam lugs 59 and 60 at the start of the respective inclined cam groove portions 160 and 172 of cam grooves 150 and 154 of the opposing receptacle half shells 80 and 82. As illustrated in FIGS. 21 and 23B, groove portion 176 is inclined in the opposite direction to groove portion 172, while groove portion 160 is inclined in the opposite direction to groove portion 165 in the opposite half shell 80. Thus, the plug and receptacle seals rotate in opposite directions during mating, tending to sweep any debris between the seals away from the seal surfaces. At positions 159C and 160C in FIG. 23C, plug cam lugs 159 and receptacle cam lugs 160 have reached the ends of the respective inclined portions 160 and 165 and entered straight portions 162 and 166, respectively. In FIG. 21, the equivalent positions 160C and 159C are shown for plug cam lugs 160 and receptacle cam lugs 159 in straight portions 177 and 173 of grooves 155 and 154, respectively, of half shell 82. At this point, all rolling seals are fully open and actuation is complete.

Figure 23D:
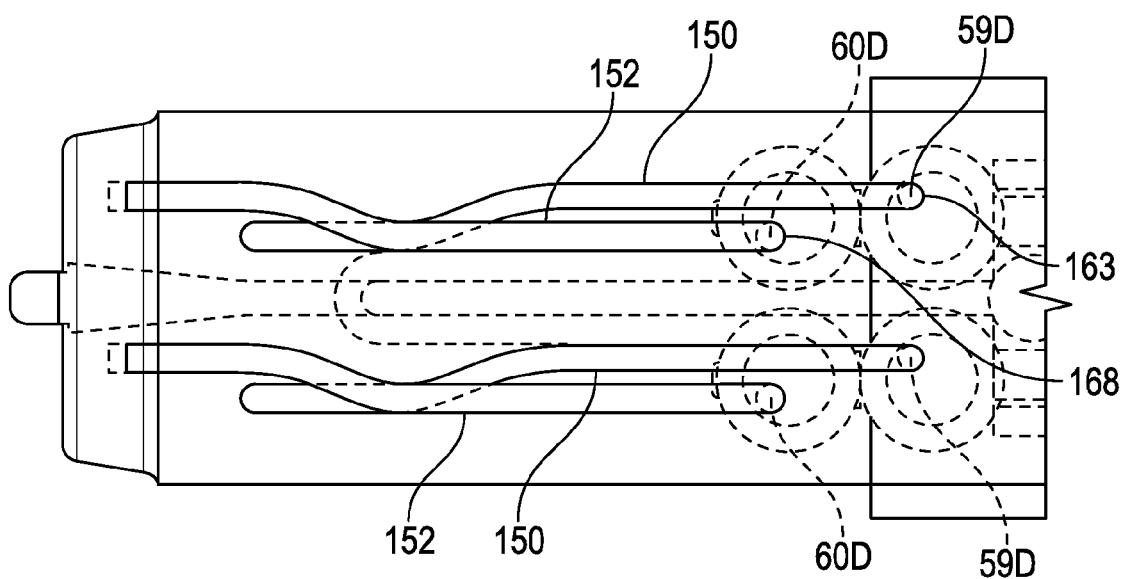

As the plug and receptacle rolling seals 18 continue back further into the receptacle shell with the seal openings 20 of the receptacle and plug seals aligned and engaging over the receptacle contact stems as in FIG. 25, the optical ferrules of the plug and receptacle units interface, while the plug and receptacle cam lugs all travel to the inner or rear ends 163, 168, 174, and 178 of the respective cam grooves, as illustrated at positions 59D and 60D in FIG. 23D, and at positions 60D and 59D in FIG. 21, respectively.

Silicone oil inside the contact chambers 15,16 of the plug and receptacle manifolds helps to keep the optical faces of the contacts clean at all times and provides pressure balance via elastomeric bladders (not illustrated) surrounding the contact chambers that are exposed to the external environment through vent screens or holes in the receptacle and plug shells. In one embodiment, the plug and receptacle units are held together on mating by larger units or coupling devices in which they are installed and which are pressed together to connect the units. In this case, the force holding the larger units together also keeps the connector units mated, and there is no need for a latching mechanism between the plug and receptacle units themselves. If needed in other embodiments, a suitable latching mechanism may be provided.

The de-mating sequence to separate the plug and receptacle units or connector units 12 and 14 is the reverse of the mating sequence described above. As the units start to separate, the receptacle manifold is biased outward by return spring 88 and the plug and receptacle seals move back outward over the receptacle contact stems which are retracted out of the aligned rolling seal bores and into the receptacle contact chamber while the respective cam lugs travel back along the innermost or rear straight sections of the respective cam grooves. When the cam lugs start to travel back along the inclined sections of their respective cam grooves, the rolling seals start to roll back into the closed and sealed position. By the time the cam lugs reach the ends of the inclined sections and start to travel along the outer or front straight sections of the grooves, the seals are again fully closed and sealed in their respective seats.

The harsh environment connector described above is suitable for subsea, down-hole, and wet-mate connection but may also be used in other harsh environments using fiber optic communication. As noted above, although an optical fiber connector is described above, the connector may be a hybrid electrical and optical connector or an electrical connector in other embodiments. The connector of the illustrated embodiment is a six way connector for connecting six optical fibers, but other embodiments may have a greater or lesser number of fiber optic, electrical, or both fiber optic and electrical connections or feed throughs. This arrangement allows a relatively large number of optical or other circuits in an overall connector package which is of relatively small diameter, which is a concern where available space is limited (such as down hole connectors). In one example, a six-way fiber optic connector as described above had a diameter of around 1.25 inches. The plug and receptacle contact chambers and connecting passageways are filled with silicone oil or other dielectric fluid to keep the optical ferrules' contact surfaces clean and to produce pressure compensation by way of a manifold and bladder system similar to that used in other Teledyne Instruments subsea rolling seal connectors, such as the connector described in U.S. Pat. No. 6,017,227 referenced above. The rolling seals keep water out of the connection system and allow silicone oil to remain within the manifold contact chambers. The actuation system for the rolling seals involves less parts and avoids the need for separate actuator stems to actuate the seals.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A connector assembly, comprising:
   first and second releasably mateable connector units each having a rear end, a front end, and a longitudinal axis, and each connector unit comprising a shell, a manifold located at least partially inside the shell, at least one contact chamber containing at least one contact, each manifold having a front end wall with at least one inlet communicating with the contact chamber and aligned with the contact, the shell and manifold of each connector unit being relatively movable;
   the front end wall of each manifold having at least one recessed seat having opposite first and second ends;
   at least one rolling seal movably mounted in each recessed seat, the rolling seal having at least one through bore;
   each rolling seal being movable relative to the respective seat in a non-axial direction relative to the respective connector unit between a sealed and closed condition in which the through bore is offset from the respective inlet and the inlet is sealed when the connector units are unmated and an open condition in which the through bore is aligned with the respective inlet when the connector units are mated to allow the contact of at least one connector unit to extend through the inlet into engagement with the contact of the other connector unit;

the manifold of the second connector unit being retractable in a rearward direction relative to the respective shell and the shell of the first connector unit being retractable in a rearward direction relative to the respective manifold during mating of the connector units, whereby a forward portion of the manifold of the first connector unit enters the shell of the second connector unit on mating; and the shell of the second connector unit having inwardly facing cam formations and the rolling seals of the first and second connector units each having at least one outwardly directed, eccentric rotator configured for engagement with a respective cam formation on the shell on mating and de-mating of the connector units, whereby travel of the respective rotators along the respective cam formations during mating and de-mating rotates the rolling seals of both connector units into the open and closed positions, respectively.

2. The connector of claim 1, wherein each recessed seat is of part-cylindrical shape and has opposite first and second open ends and each rolling seal is of cylindrical shape substantially matching the shape of the recessed seat and configured for rotatable sealing engagement in said seat.

3. The connector of claim 1, wherein the shell of the second connector unit has opposing first and second inner faces on opposite sides of said manifold, said first and second inner faces having inwardly facing cam formations, and each rolling seal has opposite first and second ends and opposite eccentric rotators for engagement in the respective cam formations on the first and second inner faces during mating and de-mating of the connector units.

4. The connector of claim 3, wherein the first and second inner faces of the shell of the second connector unit further comprise a first elongate, straight alignment formation and the manifolds of both connector units have opposite outer faces which face the respective first and second inner faces of the shell of the second connector unit during mating and de-mating and have outwardly directed second alignment formations configured for mated sliding engagement with the respective first elongate, straight alignment formations for alignment of the respective manifolds during mating and de-mating.

5. The connector of claim 3, wherein the first and second inner faces of the shell of the first connector unit and the opposing outer faces of both manifolds are at least partially flat faces which are in face-to-face sliding engagement during mating and de-mating of the units.

6. The connector of claim 4, wherein the shell of the first connector unit has opposing inner faces on opposite sides of the manifold of the first connector unit which are aligned with the corresponding inner faces of the shell of the second connector unit during mating and de-mating, and the inner faces of the shell of the first connector unit have respective first elongate, straight alignment formations which receive the respective opposite eccentric rotators of the seal of the first connector unit in the unmated condition and which guide the respective opposite eccentric rotators into engagement with the cam formations on the respective opposite inner faces of the shell of the second connector unit during mating of the units.

7. The connector of claim 6, wherein the opposing inner faces of the shell of the first connector unit have respective second elongate, straight alignment formations which receive the second alignment formations on opposite sides of the manifold of the first connector unit when the units are unmated and which direct the second alignment formations into the first elongate, straight alignment formations of the first connector unit during mating of the units.

8. The connector of claim 3, wherein the cam formations on the first inner face comprise at least one first cam formation which receives a first eccentric rotator of the rolling seal of the second connector unit and at least one second cam formation which is configured to receive a second eccentric rotator of the rolling seal of the first connector unit during mating and de-mating, and the cam formations on the second inner face comprise at least one first cam formation which receives a second eccentric rotator of the rolling seal of the second connector unit and at least one second cam formation which is configured to receive a first eccentric rotator of the rolling seal of the first connector unit during mating and de-mating.

9. The connector of claim 3, wherein the opposite eccentric rotators of each rolling seal comprise a first cam lug and a second cam lug, the first cam lug of each rolling seal being of different dimensions than the second cam lug, and the rolling seals of the first and second connector units being oriented during mating and de-mating such that the first and second cam lugs of the seal in the second connector unit engage cam formations on the first and second opposing inner faces, respectively, of the shell of the second connector unit, and the second and first cam lugs, respectively, of the seal in the first connector unit engage cam formations on the respective first and second opposing inner faces of the shell of the second connector unit during mating and de-mating of the units.

10. The connector of claim 9, wherein the cam formations on each inner face of the shell comprise at least one first cam formation of dimensions configured to receive a first cam lug and at least one second cam formation of different dimensions from the first cam formation configured to receive a second cam lug.

11. The connector of claim 9, wherein the opposite inner faces of the shell of the second connector unit further comprise a first elongate alignment formation and the manifolds of both connector units have opposite outer faces which face the opposite inner faces of the shell during mating and de-mating and have outwardly directed second alignment formations configured for mated sliding engagement with the respective first elongate alignment formations for alignment of the respective manifolds during mating and de-mating.

12. The connector of claim 8, wherein the shell of the first connector unit has opposing first and second inner faces on opposite sides of the manifold of the first connector unit, each inner face having an alignment formation for guiding the respective second and first eccentric rotators of the rolling seal of the first connector unit into the respective second cam formation of the first inner face and second cam formation of the second inner face of the shell of the second connector unit as the manifold of the first connector unit enters the shell of the second connector unit during mating engagement of the units.

13. A connector assembly, comprising:

first and second releasably mateable connector units each having a rear end, a front end, and a longitudinal axis, and each connector unit comprising a shell, a manifold located at least partially inside the shell, at least one contact chamber containing at least one contact, each manifold having a front end wall with at least one inlet communicating with the contact chamber and aligned with the contact, the shell and manifold of each connector unit being relatively movable;

the front end wall of each manifold having at least one recessed seat having opposite first and second ends;

at least one rolling seal movably mounted in each recessed seat, the rolling seal having at least one through bore;

each rolling seal being movable relative to the respective seat in a non-axial direction relative to the respective connector unit between a sealed and closed condition in which the through bore is offset from the respective inlet and the inlet is sealed when the connector units are unmated and an open condition in which the through bore is aligned with the respective inlet when the connector units are mated to allow the contact of at least one connector unit to extend through the inlet into engagement with the contact of the other connector unit;

the manifold of the second connector unit being retractable in a rearward direction relative to the respective shell and the shell of the first connector unit being retractable in a rearward direction relative to the respective manifold during mating of the connector units, whereby a forward portion of the manifold of the first connector unit enters the shell of the second connector unit on mating; and the shell of the second connector unit having inwardly facing cam formations and each rolling seal having at least one outwardly directed, eccentric rotator configured for engagement with a respective cam formation on mating and de-mating of the connector units, whereby travel of the respective rotators along the respective cam formations during mating and de-mating rotates the rolling seals of both connector units into the open and closed positions, respectively;

wherein a plurality of through bores extend through each seal member in a direction transverse to the longitudinal axis, the front end wall of each manifold has a plurality of inlets extending between the respective contact chamber and recessed seat and positioned for alignment with the respective seal through bores in the open position of the respective seal, and a plurality of contacts are located in the contact chamber and aligned with the respective inlets.

14. The connector of claim 13, wherein the front end wall of each manifold has at least first and second recessed seats which extend parallel to one another on opposite sides of the central longitudinal axis of the respective connector unit, at least first and second rolling seals are rotatably mounted in the respective first and second recessed seats, a first set of contacts is arranged in a row aligned with respective inlets in the first recessed seat and a second set of contacts is arranged in a row aligned with respective inlets in the second recessed seat.

15. The connector of claim 14, wherein the shell of the second connector unit has opposing first and second inner faces on opposite sides of said manifold, each rolling seal has oppositely directed eccentric rotators at opposite ends of the respective rolling seal, and the inwardly facing cam formations comprise first and second sets of cam formations on each of the opposing inner faces of the shell positioned to receive eccentric rotators at opposite ends of the respective first and second rolling seals of the first and second connector units.

16. The connector of claim 15, wherein each of the first and second inner faces has a first straight, elongate alignment formation located between the first and second sets of cam formations and the manifolds of the first and second connector units have oppositely directed second straight, elongate alignment formations configured for slidable mating engagement with the respective first alignment formations during mating and de-mating of the units.

17. The connector of claim 3, wherein the inwardly facing cam formations on each inner face of the shell of the second connector unit each comprise at least one intersecting pair of cam grooves configured for receiving eccentric rotators at the ends of respective rolling seals of the first and second connector units during mating and de-mating, each cam groove of each intersecting pair having a first straight section, an inclined section, and a second straight section.

18. The connector of claim 17, wherein the inclined sections of the cam grooves of each intersecting pair of cam grooves overlap and are inclined in opposite directions, whereby the seals in the first and second connector units roll in opposite directions during mating of the units and during de-mating of the units.

19. The connector of claim 17, wherein the cam grooves of each intersecting pair are of different dimensions and the respective eccentric rotators of the seals of the first and second connector units which engage the cam grooves of each pair are of corresponding different dimensions.

20. The connector of claim 17, wherein the cam grooves are configured to rotate the seals of the first and second connector units in unison during mating and de-mating.

21. The connector of claim 17, wherein each connector unit has at least first and second rolling seals in rolling engagement with respective parallel recessed seats on the front end faces of the respective connector manifold, and the inwardly facing cam formations on each inner face of the shell of the second connector unit comprise at least first and second spaced intersecting pairs of cam grooves, the first pair of cam grooves being configured to receive eccentric rotators at respective first ends of the first rolling seals of the connector units and the second pair of cam grooves being configured to receive eccentric rotators at respective second ends of the second rolling seals of the connector units.

22. The connector of claim 3, wherein each rolling seal has a central axle of rigid material and an outer layer of elastomeric material, and eccentric rotators of different dimensions extend from opposite ends of the central axle for engagement with respective cam formations in the opposing inner faces of the shell of the second connector unit during mating and de-mating.

23. The connector of claim 22, wherein each rolling seal is of larger dimensions than the respective recessed seat in which it is seated, whereby a portion of the elastomeric layer of the seal projects outwardly from the seat for face-to-face sealing engagement with the corresponding projecting portion of the elastomeric layer of the opposing seal during mating and de-mating of the units.

24. The connector of claim 22, wherein the eccentric rotators of each rolling seal comprise a first and second cam lugs of different diameter and length projecting from opposite ends of the rolling seal.

25. The connector of claim 24, wherein the cam formations in opposing inner faces of the shell of the first connector unit comprise grooves of different width and depth configured for receiving the respective first and second cam lugs of the rolling seals of the first and second connector units.

26. The connector of claim 25, wherein the cam formations in each inner face comprise at least one first cam groove and at least one second cam groove of different width and depth for receiving respective cam lugs of the rolling seals of the first and second connector units.

27. The connector of claim 26, wherein the shell of the first connector unit has opposing inner faces on opposite sides of the manifold which have alignment formations which receive respective cam lugs of the rolling seal of the first connector unit in the unmated condition and which are configured to align the respective cam lugs with the respective cam grooves in opposing inner faces of the shell of the second connector unit during mating of the units.

28. The connector of claim 1, wherein the manifolds are each of matching, at least partially rectangular cross-sectional shape along at least part of their length extending from the front end wall.

29. The connector of claim 28, wherein the shells of the first and second connector units each have a rear portion and spaced side walls extending forward from the rear portion with a gap between the side walls in which at least part of the manifold is slidably received in the unmated condition of the units.

30. The connector of claim 28, wherein each manifold has a pair of oppositely directed, substantially flat side walls facing the opposing inner surfaces of the shell of the second connector unit in the mated condition, and first and second oppositely directed end walls of arcuate shape.

* * * * *